United States Patent
Fury et al.

(10) Patent No.: US 10,317,291 B2
(45) Date of Patent: Jun. 11, 2019

(54) ENVIRONMENTAL SENSOR SYSTEM AND SIGNAL PROCESSOR

(71) Applicant: Brewer Science Inc., Rolla, MO (US)

(72) Inventors: Jonathan Fury, Springfield, MO (US); Nicholas Anthony, Sisters, OR (US); Ryan Giedd, Springfield, MO (US)

(73) Assignee: Brewer Science, Inc., Rolla, MO (US)

( * ) Notice: Subject to any disclaimer, the term of this patent is extended or adjusted under 35 U.S.C. 154(b) by 114 days.

(21) Appl. No.: 15/228,790

(22) Filed: Aug. 4, 2016

(65) Prior Publication Data
US 2017/0038263 A1    Feb. 9, 2017

Related U.S. Application Data

(60) Provisional application No. 62/202,483, filed on Aug. 7, 2015.

(51) Int. Cl.
| G01K 1/18 | (2006.01) |
| G01K 3/10 | (2006.01) |
| G01K 7/16 | (2006.01) |
| G01K 7/20 | (2006.01) |

(52) U.S. Cl.
CPC ............. *G01K 7/16* (2013.01); *G01K 1/18* (2013.01); *G01K 3/10* (2013.01); *G01K 7/20* (2013.01)

(58) Field of Classification Search
CPC ........................................................ G01K 7/16
See application file for complete search history.

(56) References Cited

U.S. PATENT DOCUMENTS

| 3,878,724 A | 4/1975 | Allen |
| 4,103,161 A | 7/1978 | Thomasson |
| 4,836,442 A | 6/1989 | Beckey |
| 2016/0025517 A1 | 1/2016 | Giedd et al. |

FOREIGN PATENT DOCUMENTS

| EP | 0 162 652 | 5/1991 |
| JP | 2013-108813 | 6/2013 |

OTHER PUBLICATIONS

Honeywell HIH-4000 Series, Humidity Sensors, Feb. 2010, 6 pages, http://sensing.honeywell.com/honeywell-sensing-hih4000-series-product-sheet-009017-5-en.pdf.
International Search Report dated Dec. 5, 2016 in corresponding PCT/US2016/045613 filed Aug. 4, 2016.
Machine Translation of JP2013-108813, 23 pages.

*Primary Examiner* — Manuel A Rivera Vargas
(74) *Attorney, Agent, or Firm* — Hovey Williams LLP

(57) ABSTRACT

A sensor system comprises a first sensor, a second sensor, a high pass filter, and a summation unit. The first sensor senses an environmental parameter and outputs a first electronic signal with a response having a first time constant. The second sensor senses the environmental parameter and outputs a second electronic signal with a response having a second time constant greater than the first time constant. The high pass filter has a filter time constant roughly equal to the second time constant and filters the first electronic signal, outputting a filtered first electronic signal in which changes in a level or value of the first electronic signal with transition times that are less than the filter time constant are passed. The summation unit receives the filtered first electronic signal and the second electronic signal and outputs a sum of the filtered first electronic signal and the second electronic signal.

20 Claims, 20 Drawing Sheets

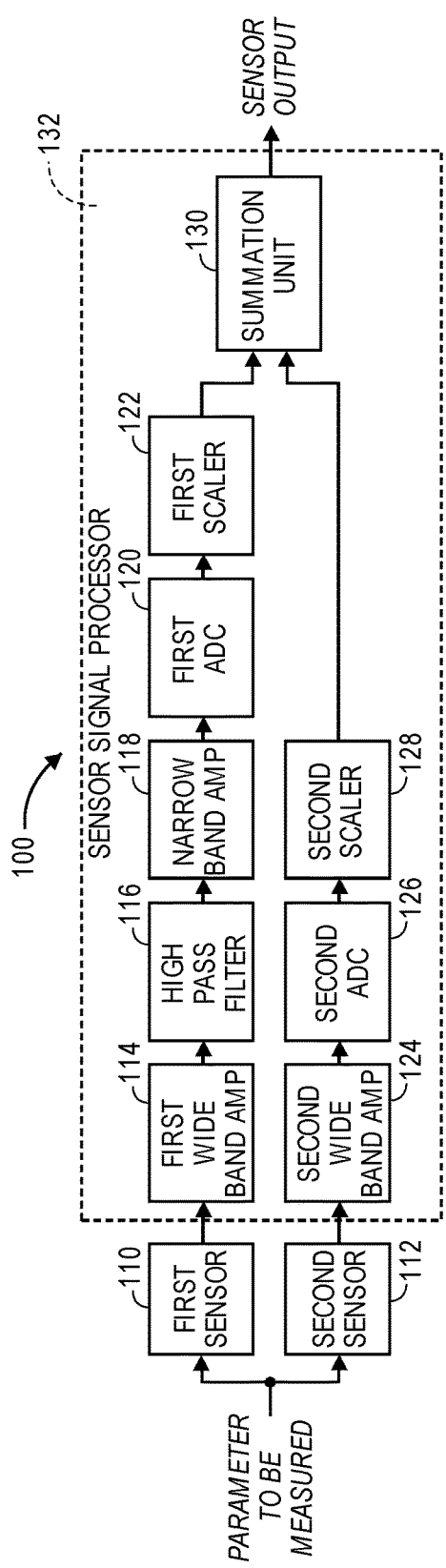
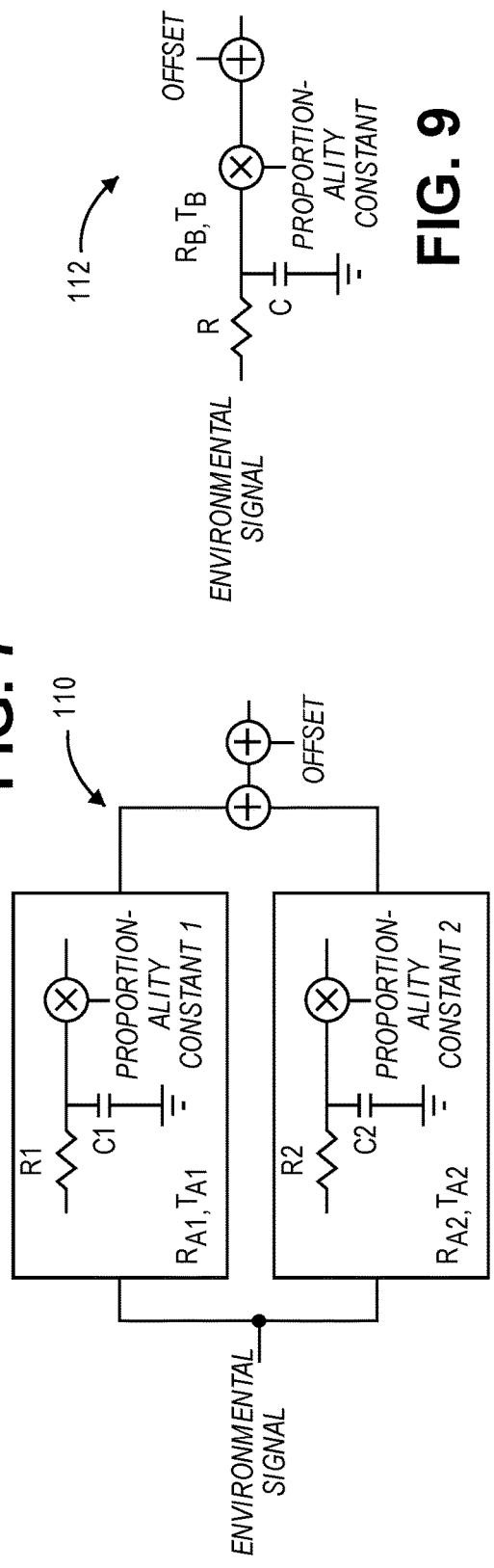
FIG. 7
FIG. 8
FIG. 9

ENVIRONMENTAL SENSOR SYSTEM AND SIGNAL PROCESSOR

RELATED APPLICATION

The current patent application is a non-provisional application which claims priority benefit to U.S. Provisional Application No. 62/202,483, entitled "SPEED-ENHANCED SENSING SYSTEM BY MULTI-SIGNAL EXTRACTION AND MIXING", and filed Aug. 7, 2015. The earlier-filed provisional application is hereby incorporated by reference in its entirety into the current application.

BACKGROUND OF THE INVENTION

Field of the Invention

Embodiments of the current invention relate to environmental sensor signal processing.

Description of the Related Art

Sensors able to detect environmental changes are in demand for a number of applications. For example, detection of changes in temperature, pressure, or various analytes in contact with the sensor (including moisture or gases in the air, etc.), is desirable for applications such as indoor and outdoor climate detection and control, process control, biometrics, medical uses, and much more. However, the usefulness of these sensors is limited by their ability not only to accurately and precisely measure stimuli, but their ability to detect and measure those stimuli in both the short and long term. Response time and settling time are very important factors when trying to measure humidity for applications where immediate detection is necessary, such as breathing sensors. The response time or time constant of a sensor is often measured as the time it takes for 63% of an equilibrium value of a sensor response to occur from no load to a step change in load. Settling time is often measured as the time it takes for a sensor to reach a stable output once it is turned on. Sensors must also be able to maintain long-term stability and measurement, and should demonstrate low hysteresis. Many previous thin-film direct-current resistive-based sensors have been plagued with poor performance as a result of very high hysteresis, low stability, and low accuracy.

SUMMARY OF THE INVENTION

Embodiments of the current invention solve the above-mentioned problems and provide a distinct advance in the art of environmental sensing. More particularly, embodiments of the invention provide an environmental sensor system which includes a first sensor having a fast response and a second sensor having a slower response. The first sensor may respond very quickly to changes in the environmental parameter to be sensed (temperature, humidity, etc.), but may be relatively less accurate such that the output of the first sensor settles on a value that is different from the actual parameter value. The second sensor may respond more slowly to changes in the environmental parameter, but may be relatively more accurate such that the output of the second sensor settles on a value that is very close to the actual parameter value. The sensor system further includes at least a high pass filter which receives the output of the first sensor and may filter the first sensor's response to complement the response of the second sensor. That is, the high pass filter allows the very quick response of the first sensor to pass, but then tapers, or suppresses, the remaining response of the first sensor as the output of the second sensor approaches the actual parameter value. The sensor system may also include a signal adder which adds the output of the high pass filter to the output of the second sensor. Thus, the sum, which is the output of the sensor system, includes the very quick response of the first sensor which is then tapered just as the response of the second sensor approaches the actual value—thereby providing environmental sensing that is both quick responding and accurate.

In some embodiments, the current invention may provide a sensor system comprising a first sensor, a second sensor, a high pass filter, and a summation unit. The first sensor may be configured to sense an environmental parameter and output a first electronic signal with a response to the environmental parameter, wherein the response has a first time constant. The second sensor may be configured to sense the environmental parameter and output a second electronic signal with a response to the environmental parameter, wherein the response has a second time constant greater than the first time constant. The high pass filter may have a first filter time constant roughly equal to the second time constant. The high pass filter may receive the first electronic signal and output a filtered first electronic signal in which changes in a level or value of the first electronic signal with transition times that are less than the first filter time constant are passed, while first electronic signal changes with transition times greater than the first filter time constant are cut off or attenuated. The summation unit may receive the filtered first electronic signal and the second electronic signal and output a third electronic signal which is the sum of the filtered first electronic signal and the second electronic signal.

In another embodiment, the current invention may provide a method of processing signals from environmental sensors. The method may comprise the steps of receiving a first electronic signal from a first environmental sensor with a response having a first time constant, the first environmental sensor sensing an environmental parameter; receiving a second electronic signal from a second environmental sensor with a response having a second time constant greater than the first time constant, the second environmental sensor sensing the environmental parameter; high pass filtering the first electronic signal with a first filter time constant is roughly equal to the second time constant, the high pass filtering producing a filtered first electronic signal; and adding the filtered first electronic signal and the second electronic signal.

In yet another embodiment, the current invention may provide a method of processing signals from temperature sensors. The method may comprise the steps of receiving a sequence of first sensor temperature values and a sequence of second sensor temperature values, one first sensor temperature value and one second sensor temperature value for each of a plurality of time periods; setting an offset value equal to an initial first sensor temperature value minus an initial second sensor temperature value; setting an output temperature value equal to an initial second sensor temperature value; setting an error value equal to a previous time period output temperature value minus a current time period second sensor temperature value for each time period; setting a current time period offset value equal to a previous time period offset value minus the error value times a proportionality constant for each time period; and setting a current time period output temperature value equal to a current time period first sensor temperature value plus the current time period offset value for each time period.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 5:
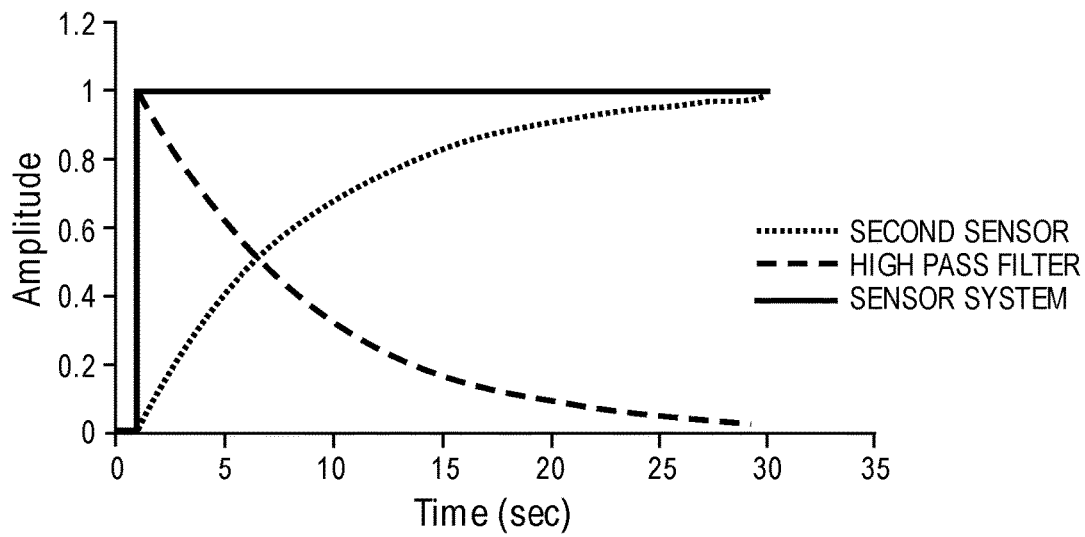
Figure 6:
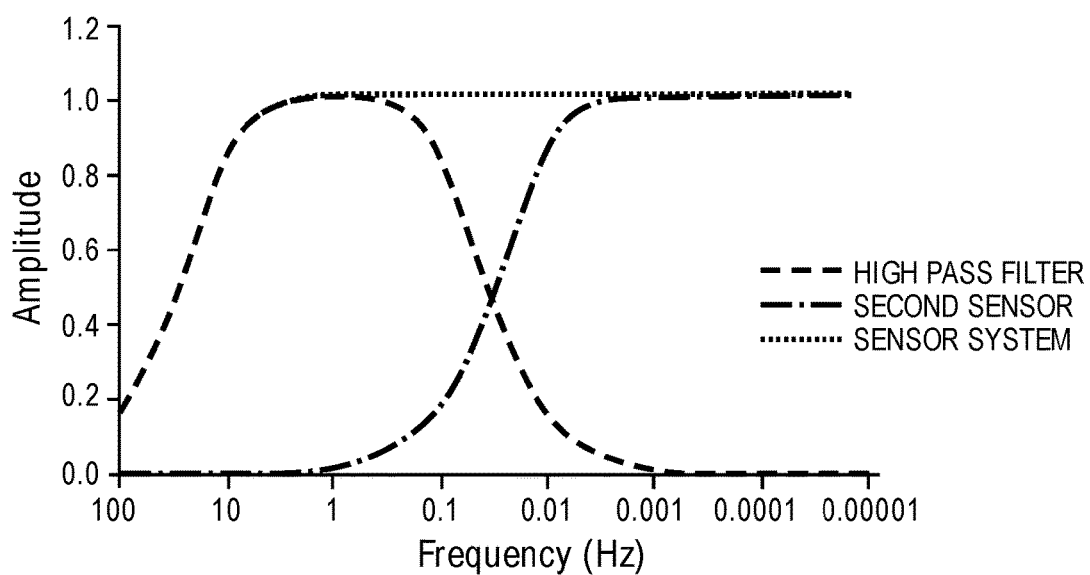
Figure 10:
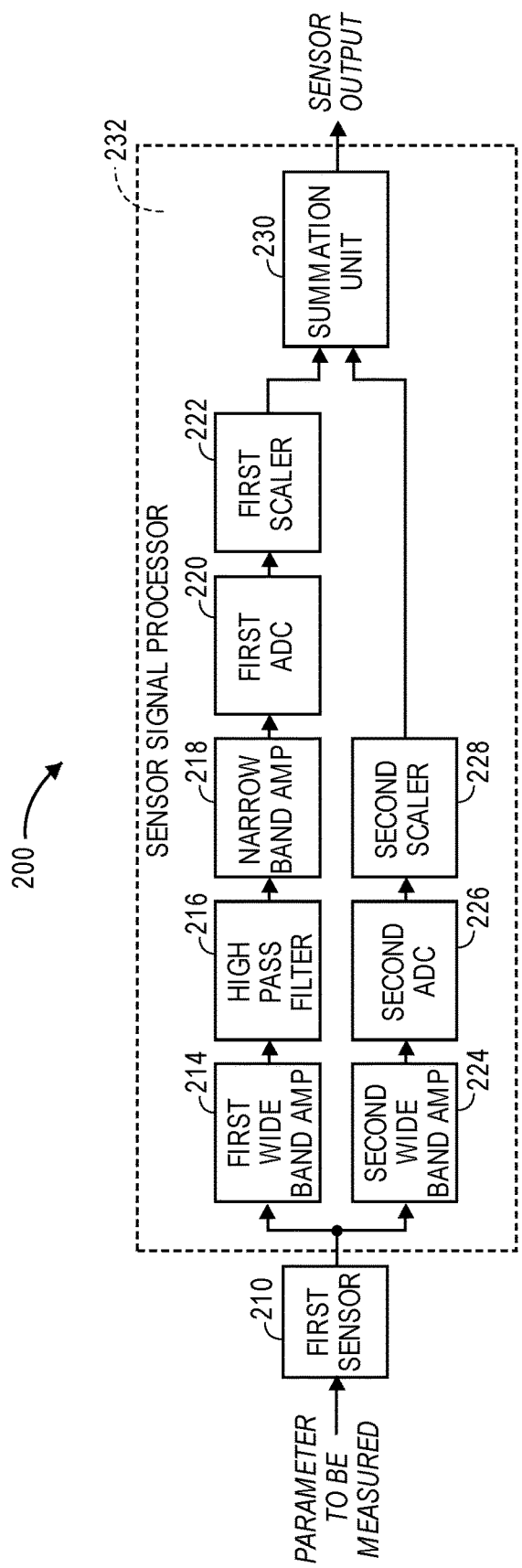
Figure 11:
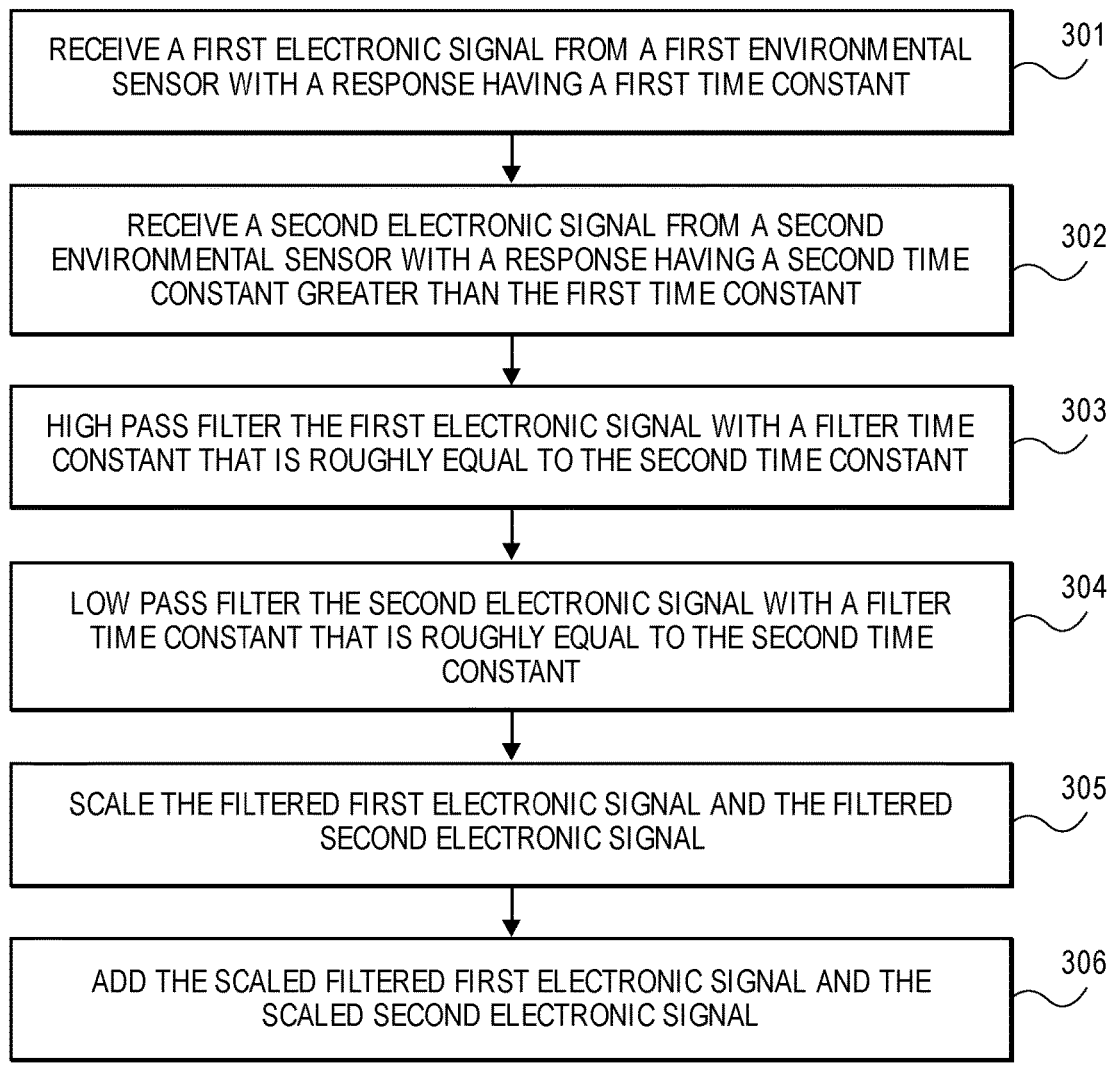
Figure 12A:
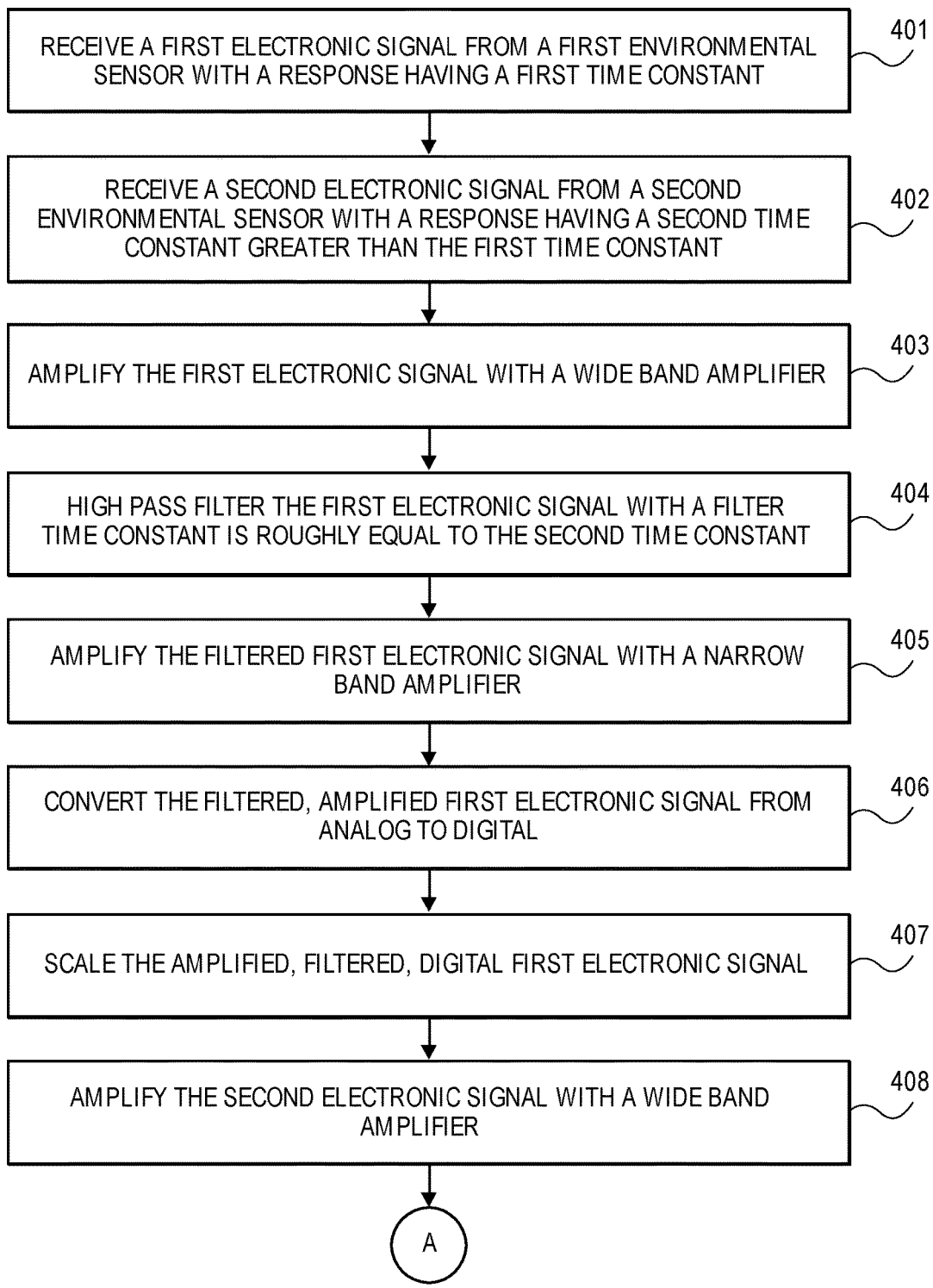
Figure 12B:
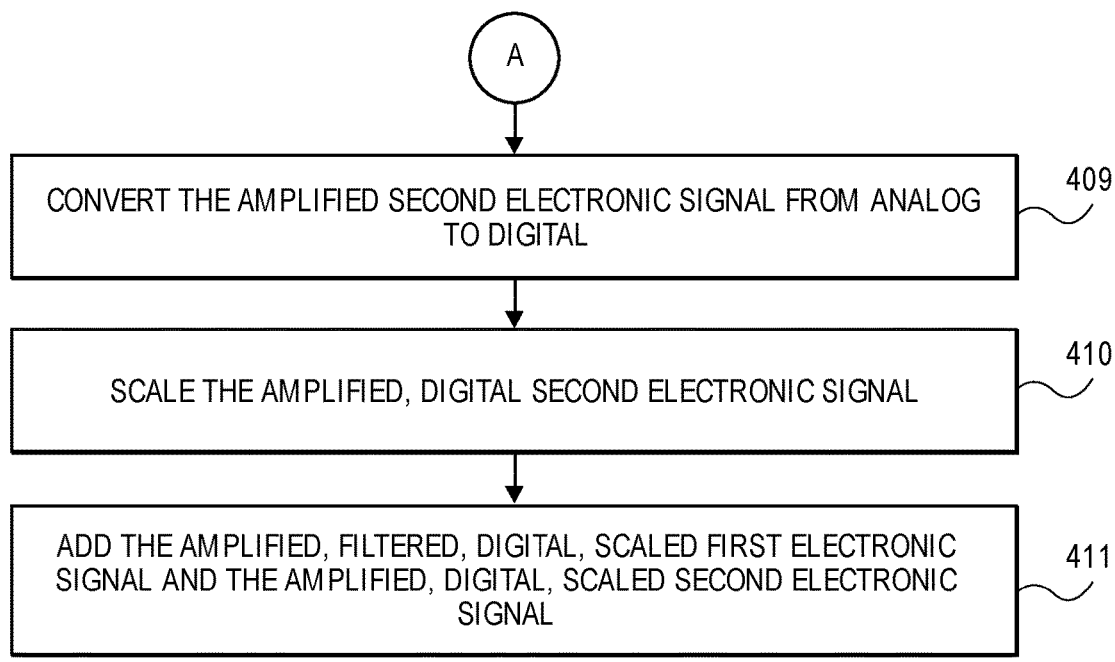
Figure 13:
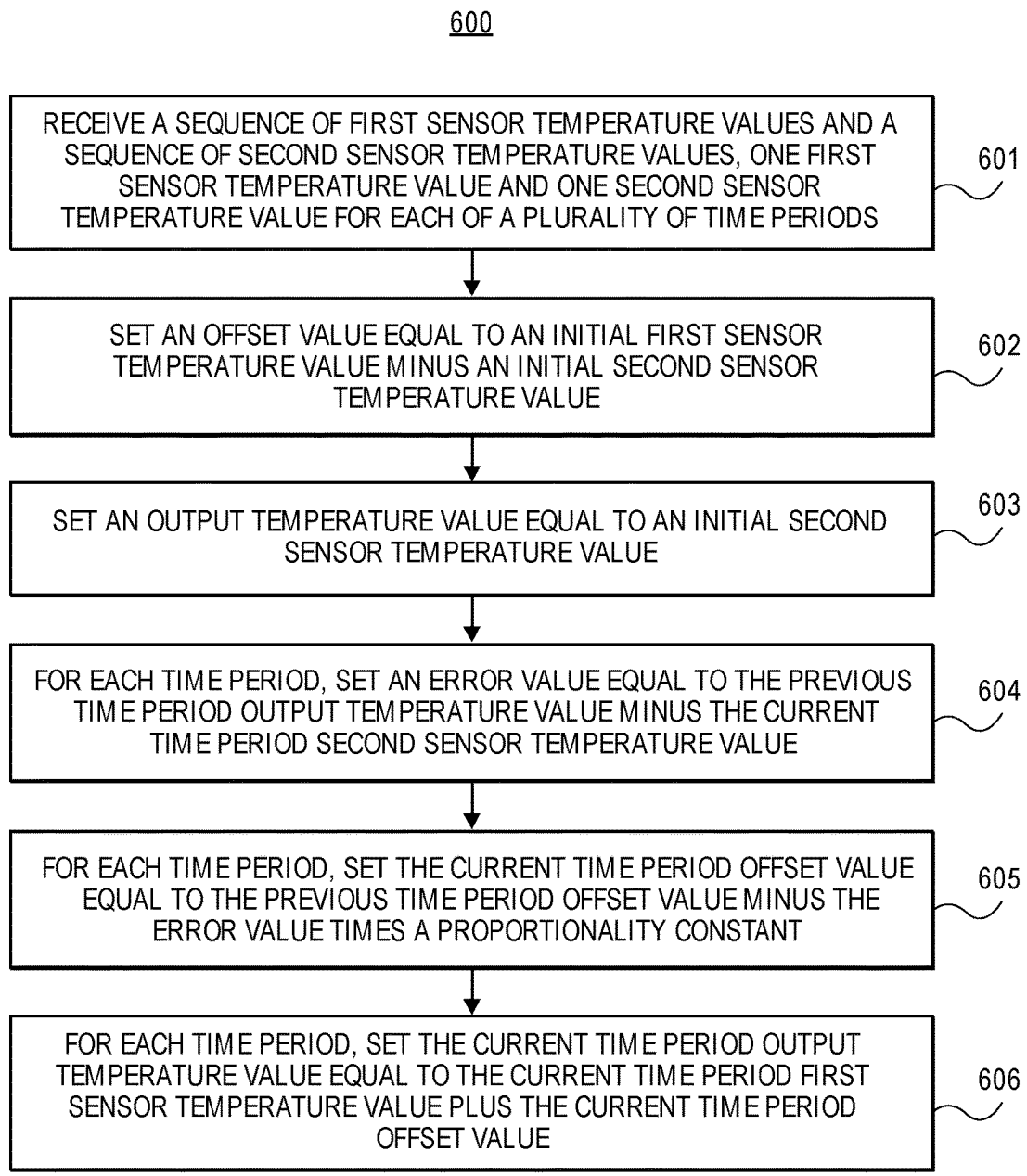
Figure 14:
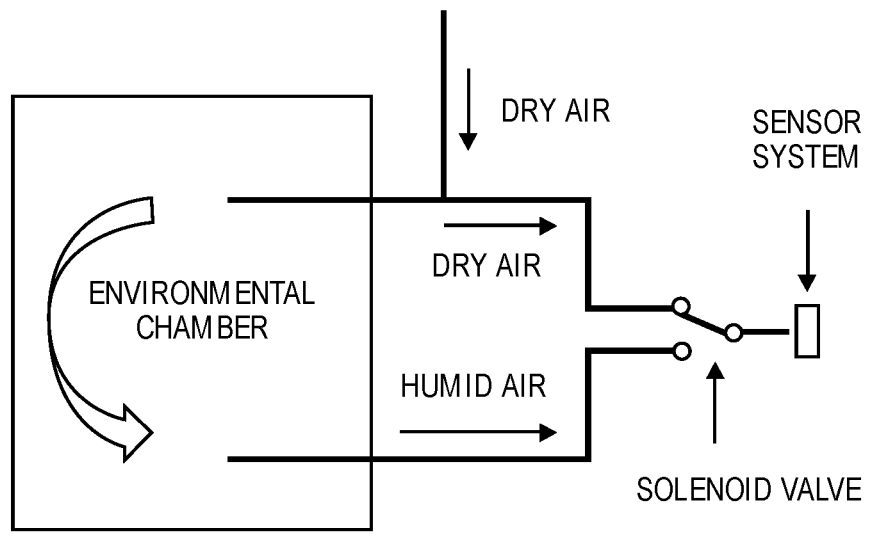
Figure 15:
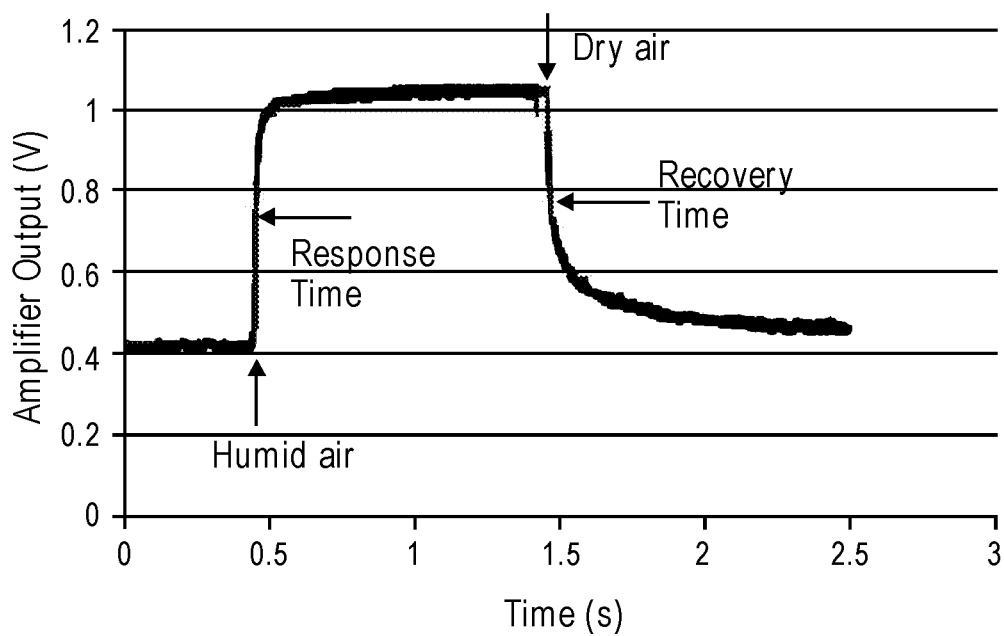
Figure 16:
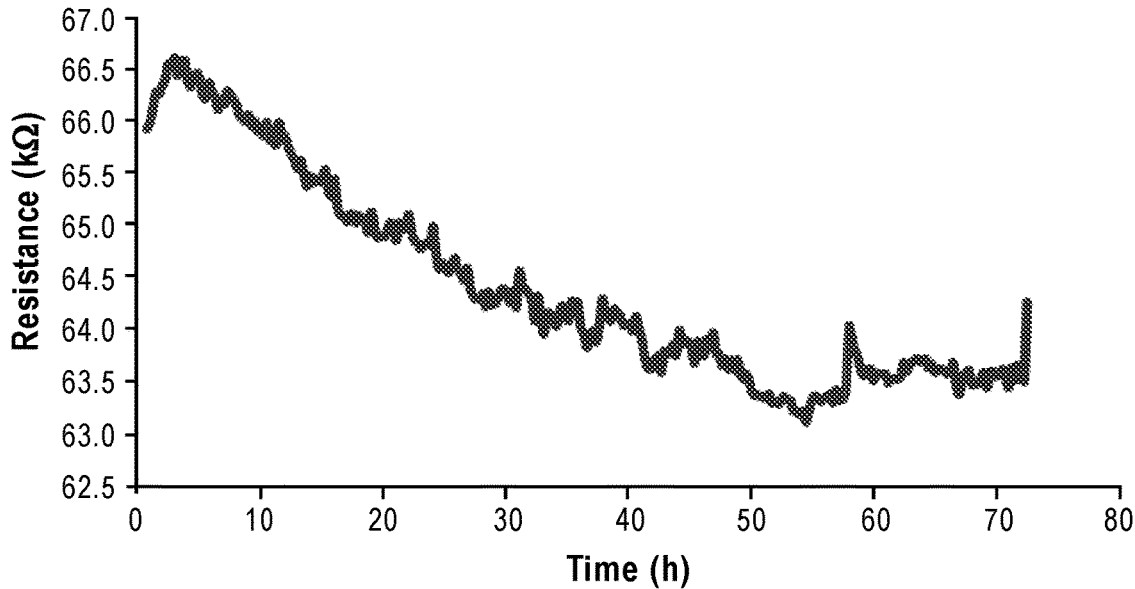
Figure 17:
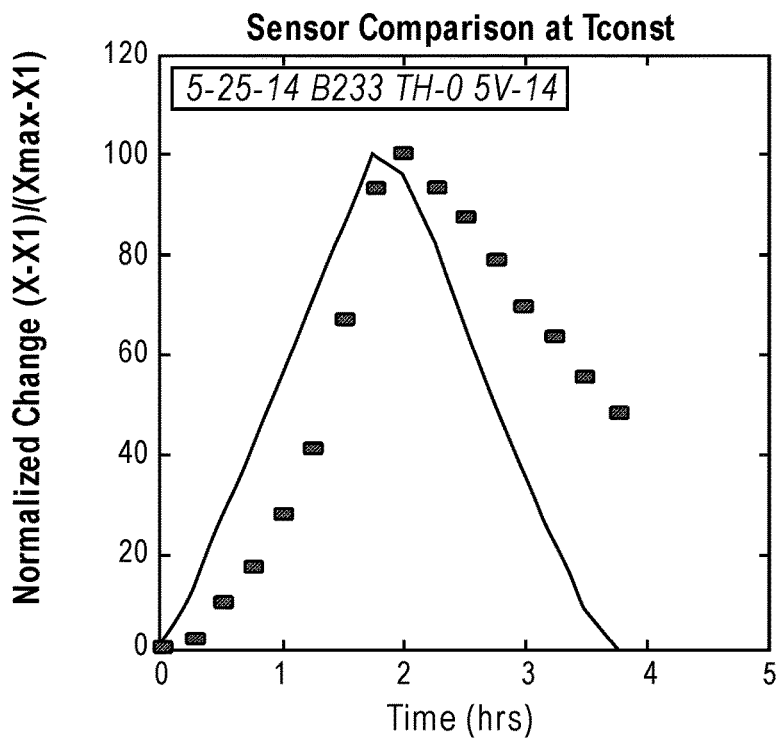
Figure 18:
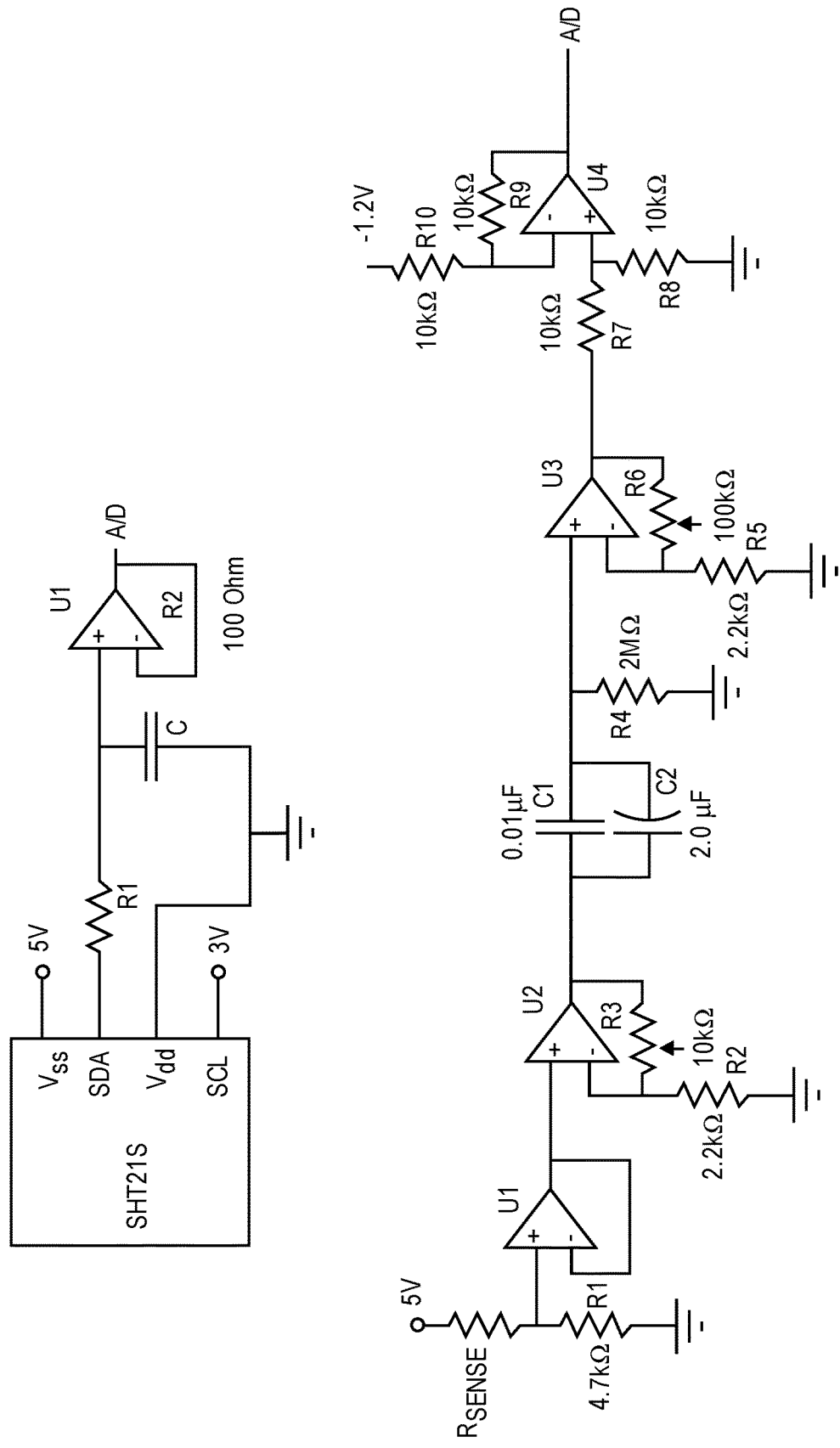
Figure 19:
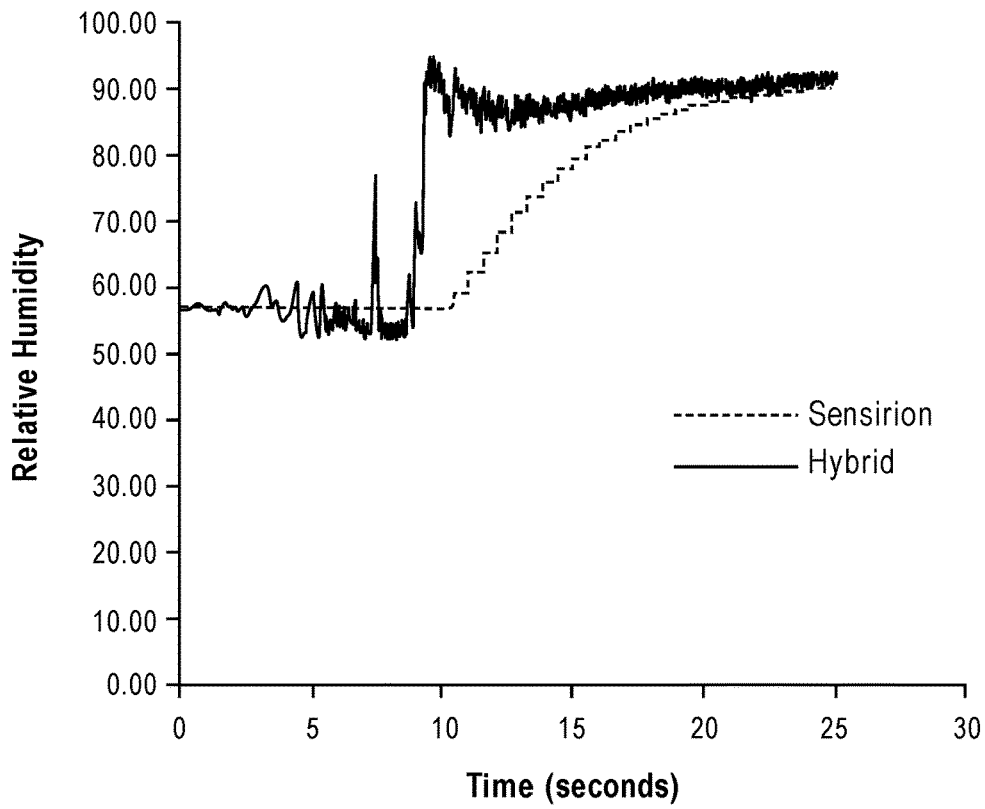
Figure 20:
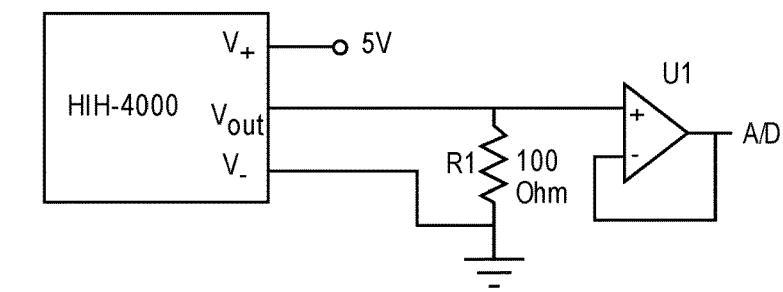
Figure 20:
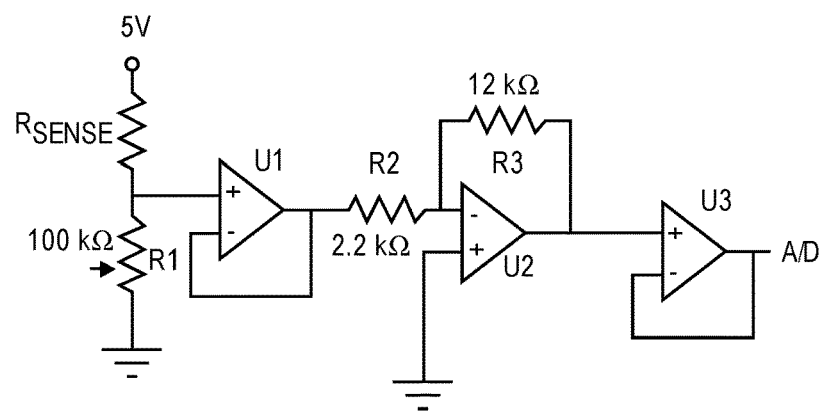
Figure 21:
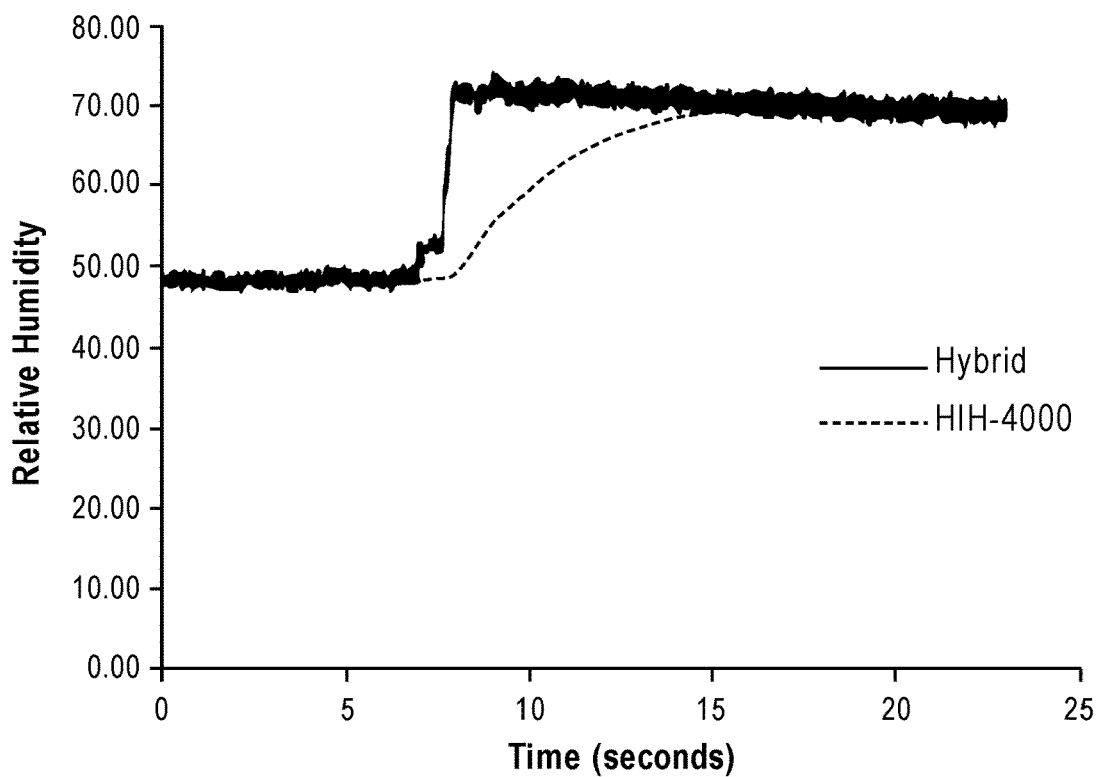
Figure 22:
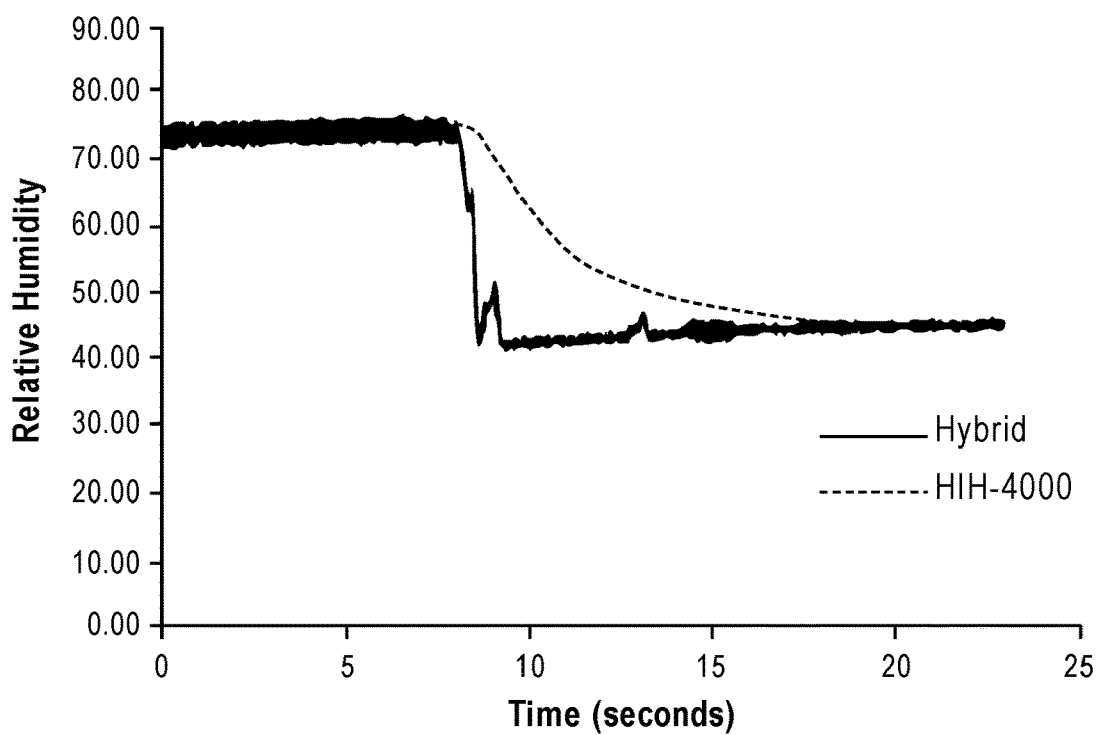
Figure 23:
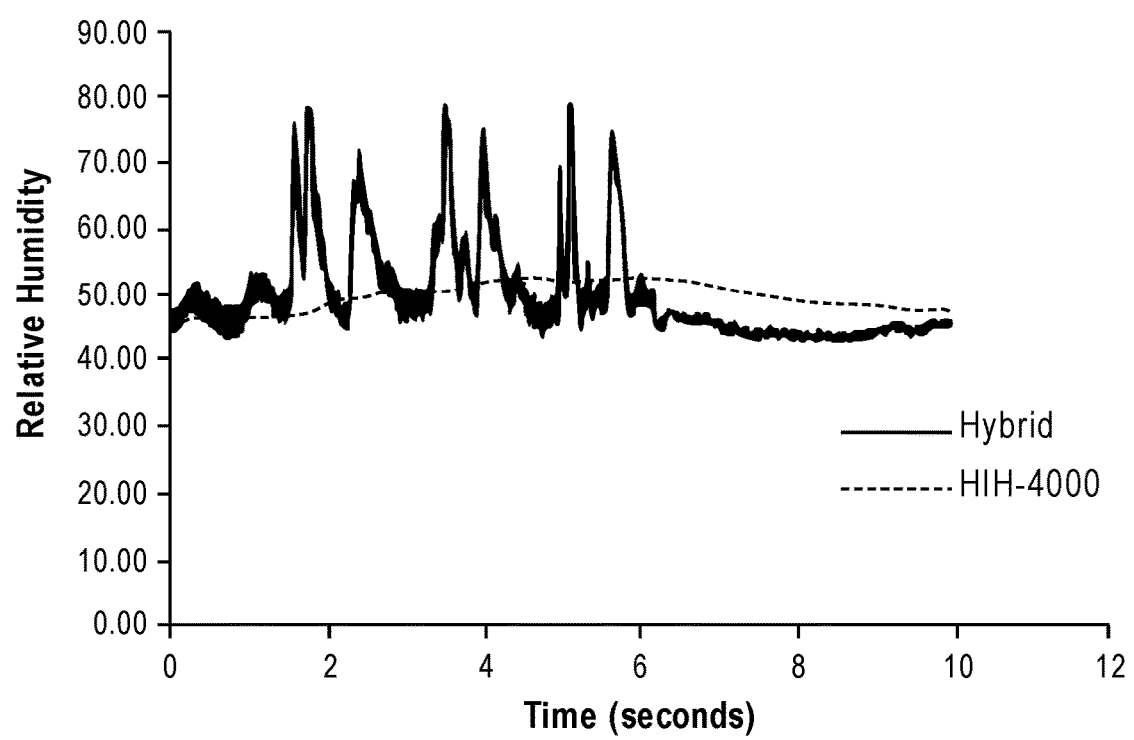
Figure 24:
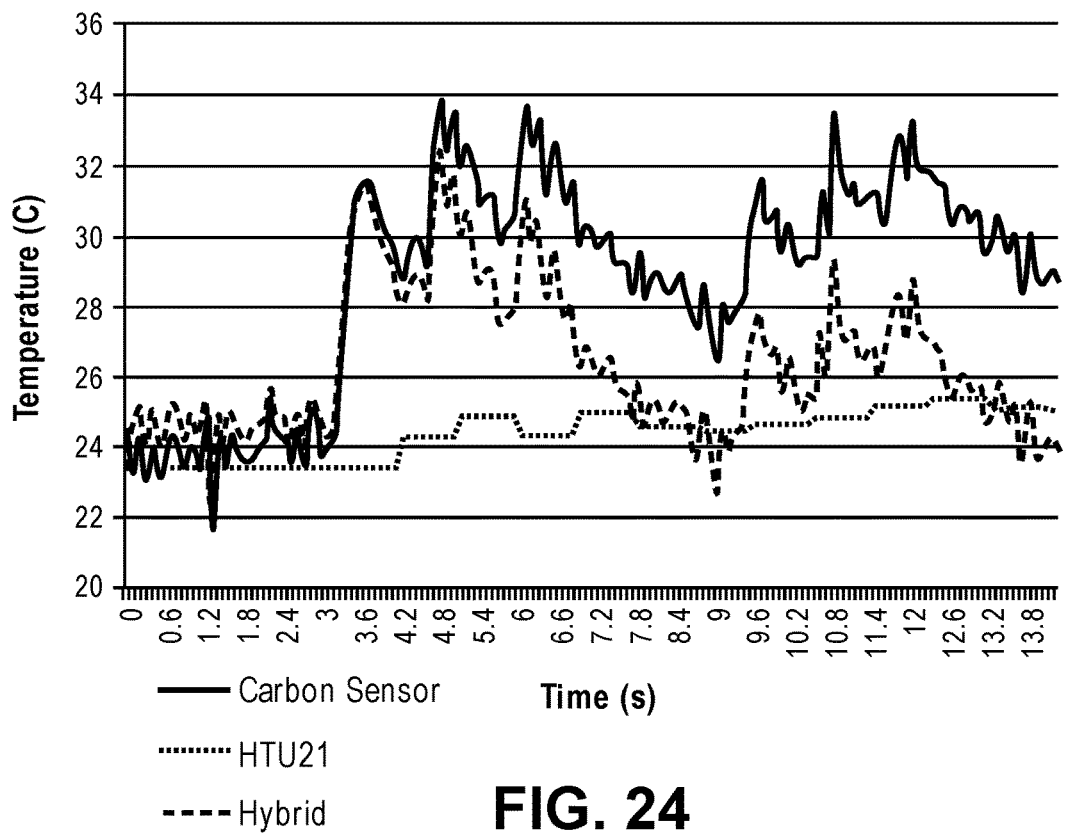
Figure 25:
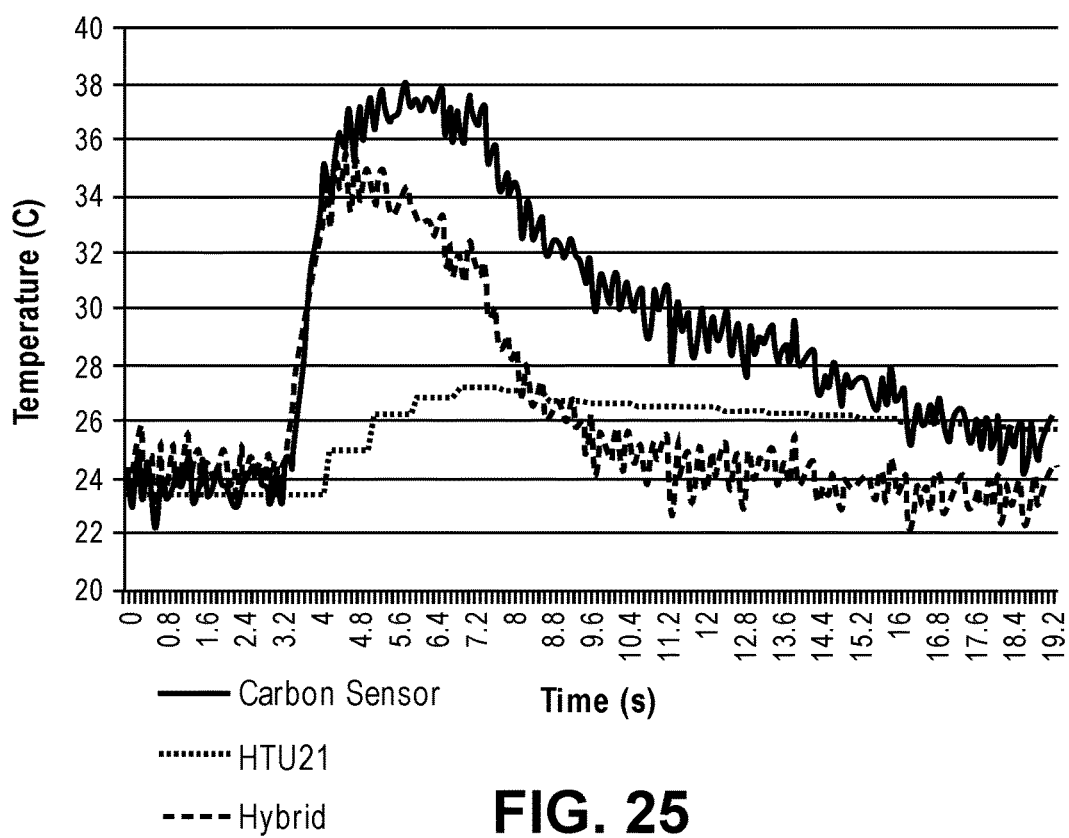
Figure 26:
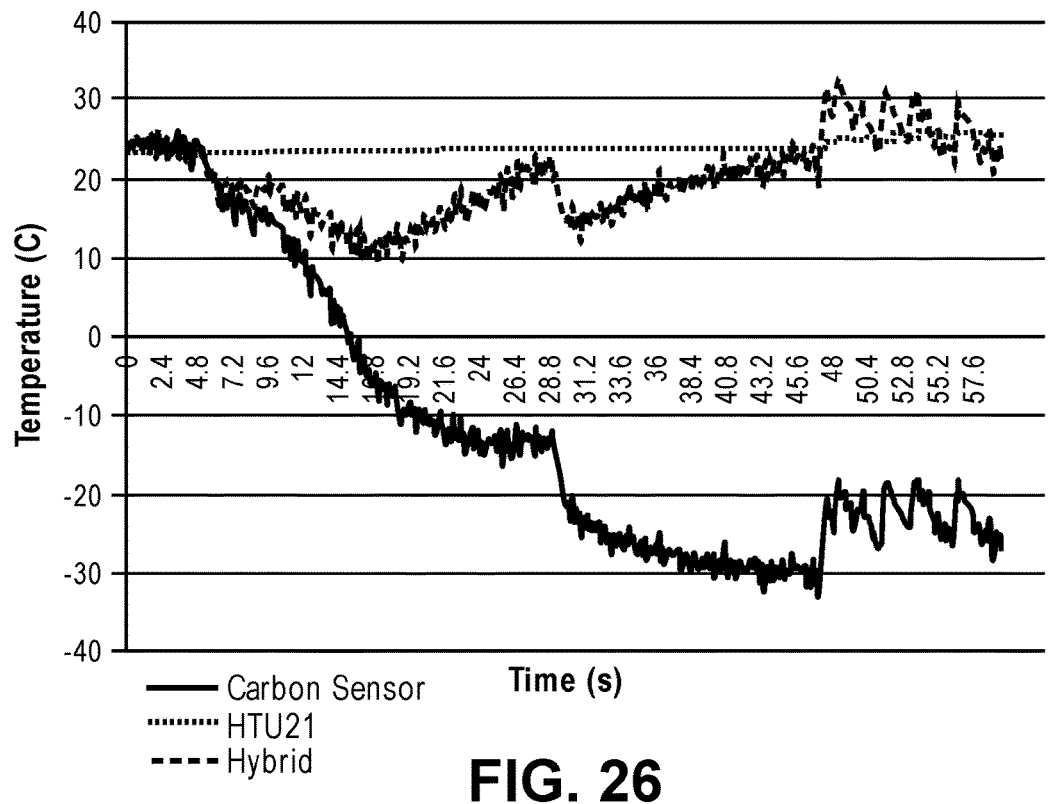
Figure 27:
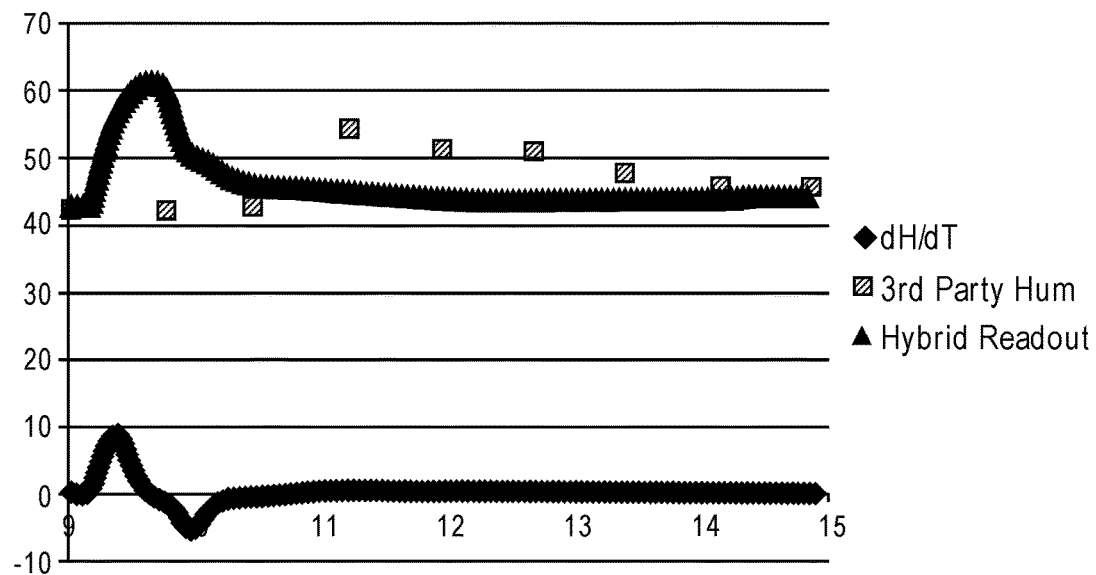
Figure 28:
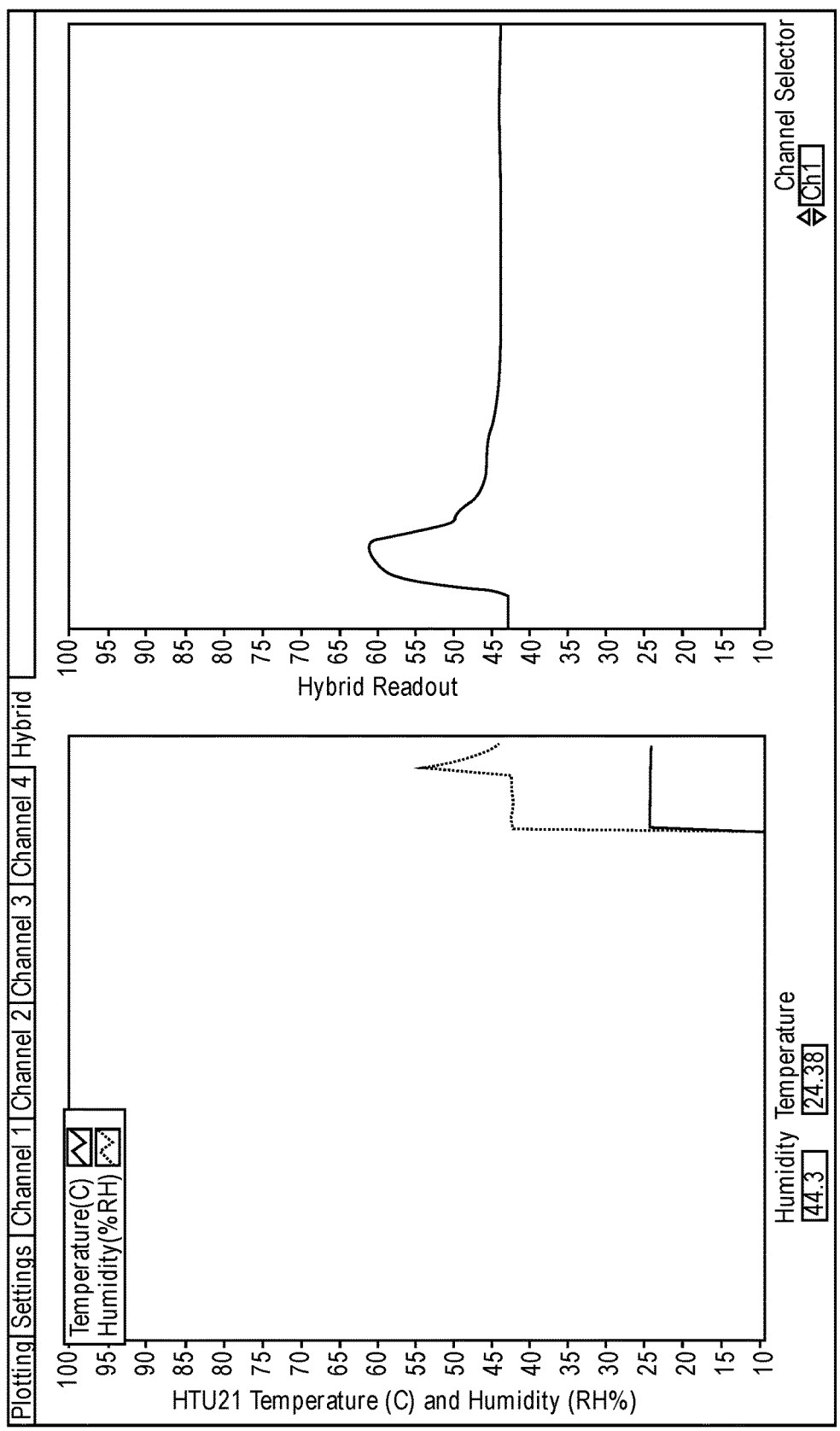
Figure 29:
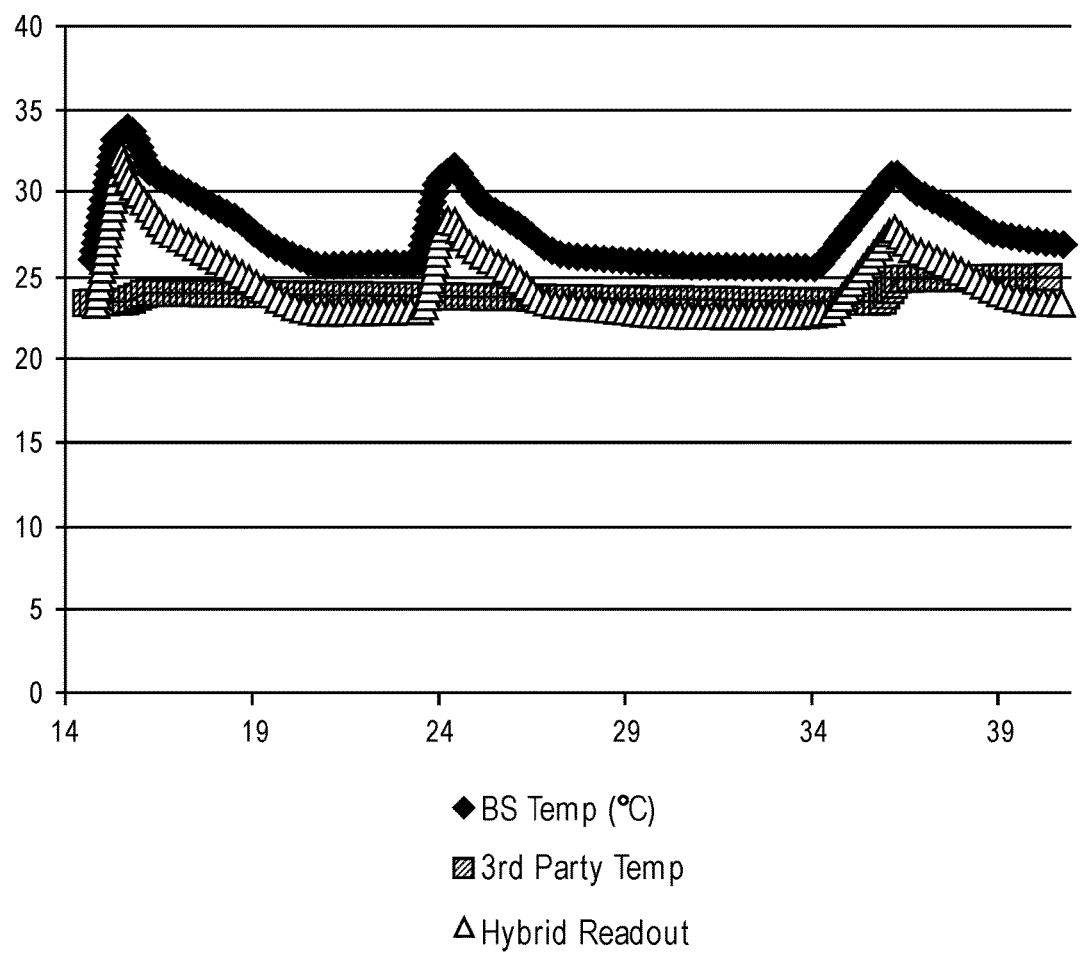
Figure 30:
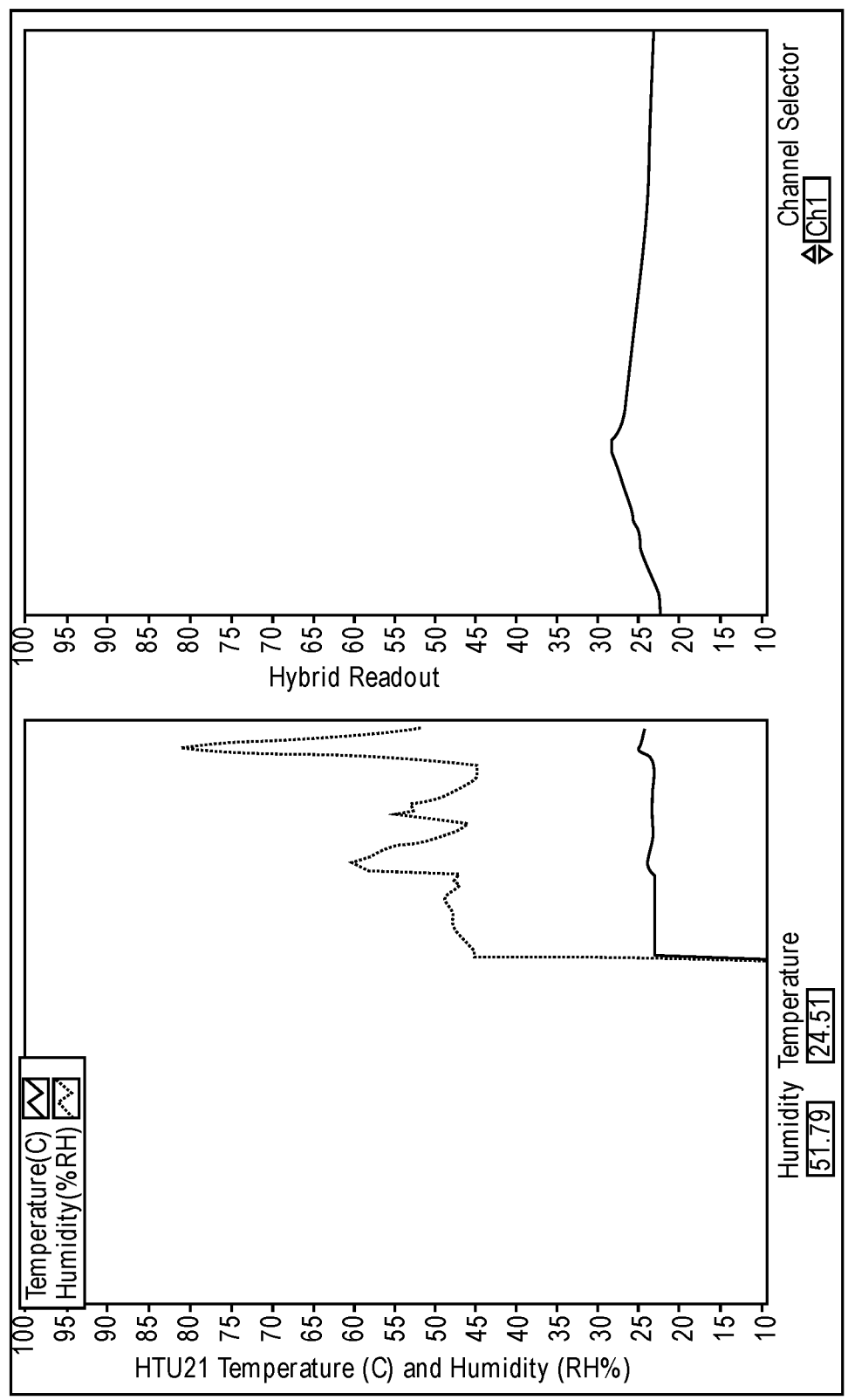

FIG. 5 a time response plot depicting an output of the second sensor, an output of the high pass filter, and an output of the sensor system;

FIG. 6 a plot depicting a frequency response of the high pass filter, a frequency response of the second sensor, and a frequency response of the sensor system;

FIG. 7 is a schematic block diagram of a second embodiment of the sensor system;

FIG. 8 is a schematic block diagram of a model of the first sensor;

FIG. 9 is a schematic block diagram of a model of the second sensor;

FIG. 10 is a schematic block diagram of a third embodiment of the sensor system;

FIG. 11 is a listing of at least a portion of the steps of a first method of processing signals from environmental sensors;

FIGS. 12A and 12B are a listing of at least a portion of the steps of a second method of processing signals from environmental sensors;

FIG. 13 is a listing of at least a portion of the steps of a first method of processing electronic signals from temperature sensors;

FIG. 14 is a schematic block diagram of an experimental setup to determine response and recovery time of an analyte sensor;

FIG. 15 is a plot of a response of a sensor to 1-second pulse of humid air;

FIG. 16 is a plot of a long-term response of CNT-based humidity sensor showing response $R_{A2}$;

FIG. 17 is a plot of a response of the sensor to a slowly varying humidity concentration;

FIG. 18 is an electrical schematic of a circuit for signal conditioning for analog implementation;

FIG. 19 is a plot of a two-sensor system response to a step in humidity;

FIG. 20 is an electrical schematic of a circuit for signal conditioning for digital implementation;

FIG. 21 is a plot of a two-sensor system and HIH-4000 response from a step up in humidity;

FIG. 22 is a plot of a two-sensor system and HIH-4000 response from a step down in humidity;

FIG. 23 is a plot of a two-sensor system and HIH-4000 response to human speech "Test Test Test";

FIG. 24 is a plot of a two-sensor system response to three rapid breaths;

FIG. 25 is a plot of a two-sensor system response to one exhale;

FIG. 26 is a plot of a two-sensor system response to bending and then three breaths;

FIG. 27 is a plot of a derivative, relative humidity, and hybrid (combined signal);

FIG. 28 is a plot of a commercial sensor readout (left) and combined signal (right);

FIG. 29 is a plot of a thermistor reading, temperature, and hybrid (combined signal); and FIG. 30 is a plot of a commercial sensor readout (left) and combined signal (right).

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
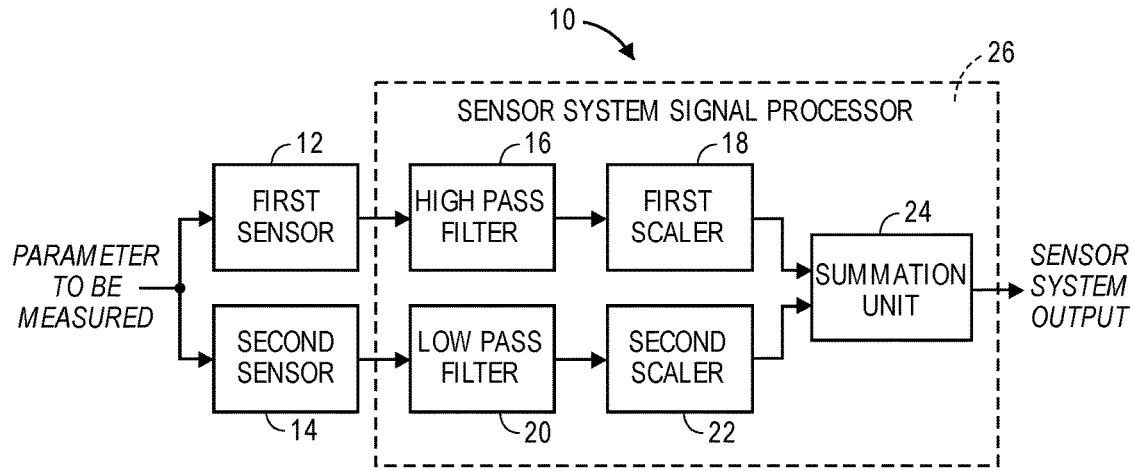
FIG. 1 is a schematic block diagram of a sensor system constructed in accordance with a first embodiment of the current invention.

Referring to FIG. 1, a sensor system 10 constructed in accordance with a first embodiment of the current invention is shown. The sensor system 10 may broadly comprise a first sensor 12, a second sensor 14, a high pass filter 16, a first scaler 18, an optional low pass filter 20, a second scaler 22, and a summation unit 24. The high pass filter 16, the first scaler 18, the low pass filter 20, the second scaler 22, and the summation unit 24 may also form a sensor system signal processor 26.

Figure 2:
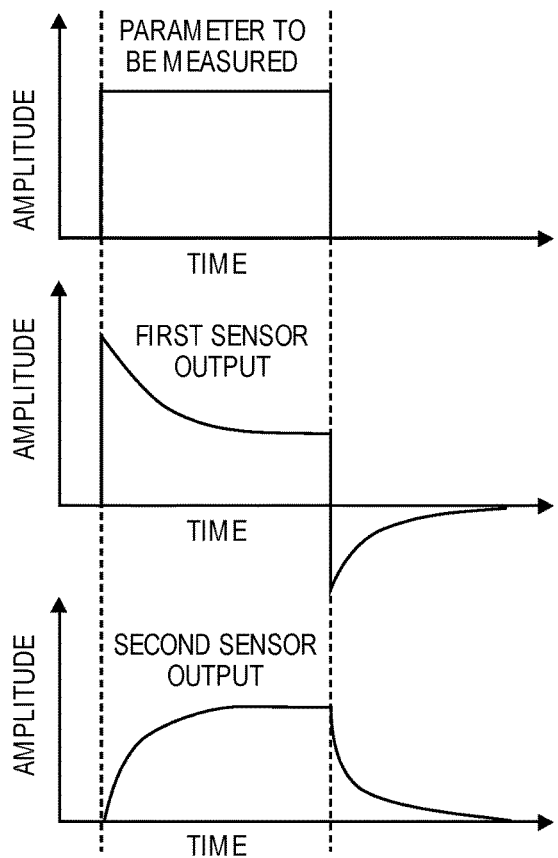
FIG. 2 is a sequence of time-based plots including a first plot depicting a step change in an input to the sensor system, a second plot depicting an output response of a first sensor, and a third plot depicting an output response of a second sensor.

The first sensor 12 is generally configured to sense environmental parameters, such as temperature, humidity, and/or analytes, and, in response, output an electronic signal with an electrical characteristic, such as voltage or current, that quickly corresponds to the behavior of, or changes in, the parameter. The first sensor 12 may include thin-film printed transducers, such as transducers with a theoretical 2-D behavior of the active sensing area. Exemplary first sensors 12 may include carbon nanotube (CNT) structures. Other exemplary first sensors 12 may include various embodiments described in U.S. patent application Ser. No. 14/806,238, which is hereby incorporated by reference in its entirety. The first sensor 12 may be what is considered a very fast sensor, with a response $R_A$ indicated by a time constant $\tau_A$ with a value that is preferably less than 1 second, more preferably less than 0.5 second, and even more preferably less than 50 milliseconds. In general, the time constant $\tau$ is the period of time that it takes for the output (of the sensor) to rise to 63% of its equilibrium value in response to a step increase or the period of time that it takes for the output to fall to 37% of its equilibrium value in response to a step decrease. The first sensor 12 may have low accuracy and high hysteresis. The first sensor 12 may produce a step response electrical output signal, as shown in the middle graph of FIG. 2, in response to the behavior of an input parameter, as shown in the top graph of FIG. 2.

The second sensor 14 is generally configured to sense environmental parameters, such as temperature, humidity, and/or analytes, and, in response, output an electronic signal with an electrical characteristic, such as voltage or current, that more slowly corresponds to the behavior of, or changes in, the parameter. The second sensor 14 may include transducers that have a bulk sensing area with a theoretical 3-D behavior of the active sensing area. Exemplary second sensors 14 may include the SHT21S from Sensirion AG of Staefa, Switzerland and the HIH-4000 from Honeywell of Morris Plains, N.J. Compared with the first sensor 12, the second sensor 14 may be considered a slow sensor, with a response $R_B$ indicated by a time constant $\tau_B$ with a value that is preferably between approximately 0.5 second and approximately 30 hours, more preferably between approximately 1 second and approximately 30 minutes, and even more preferably between approximately 5 seconds and approximately 10 seconds. In other words, the response time constant of the second sensor 14 is greater than the response time constant of the first sensor 12. The second sensor 14 may have high accuracy and low hysteresis, especially for humidity and analyte sensing. The second sensor 14 may preferably have an accuracy that is within 10% of the actual value, more preferably within 5% of the actual value, and even more preferably within 2% of the actual value. The second sensor 14 may preferably have a hysteresis of less than 10%, more preferably less than 5%, and even more preferably less than 2%. The second sensor 14 may produce a step response electrical output signal, as shown in the bottom graph of FIG. 2, in response to the behavior of an input parameter, as shown in the top graph of FIG. 2.

Figure 3:
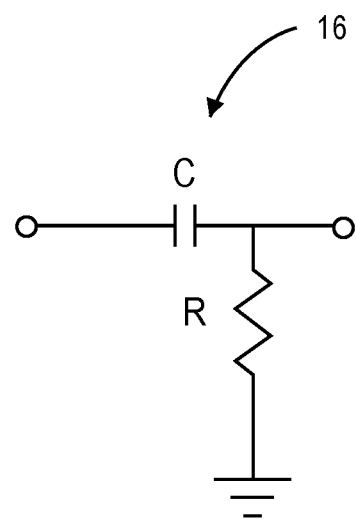
FIG. 3 is an electrical schematic of an exemplary high pass filter.

The high pass filter 16 generally passes input electronic signals with frequency components greater than a cutoff frequency to its output, while cutting off or attenuating input electronic signals with frequency components less than the cutoff frequency. In the alternative, the high pass filter 16 passes changes in the level or value of the input electronic signal with transition times that are less than a filter time constant, while cutting off or attenuating input electronic signal changes with transition times greater than the filter time constant, wherein the transition time is the period of time that it takes for the electronic signal to transition from a first value or level to a second value or level. The transition time may include rise times, fall times, and/or time constants. In general, the cutoff frequency $f_c$ is related to the time constant $\tau$ with the following relationship: $f_c=1/(2\pi\tau)$. In some embodiments, the high pass filter 16 may include electrical or electronic circuitry with passive components, such as resistors, capacitors, inductors, and transformers, active components, such as diodes, transistors, operational amplifiers (opamps), or combinations thereof to form analog electronic circuitry such as first-order or multi-order high pass signal filters. A simple example of passive electronic circuitry for the high pass filter 16, as shown in FIG. 3, may include a capacitor electrically connected in series with a resistor, wherein the signal to be filtered is electrically connected to the free end of the capacitor and the filtered signal is output across the resistor. More complex circuitry may also be utilized. In other embodiments, the high pass filter 16 may include large scale digital electronic circuits such as microprocessors (single-core and multi-core), microcontrollers, digital signal processors (DSPs), field-programmable gate arrays (FPGAs), digital application-specific integrated circuits (ASICs), or the like, or combinations thereof. In such embodiments, the high pass filter 16 may also include, or communicate with, an analog to digital converter (ADC), which samples an analog input signal and communicates a digital signal or data to the digital electronic circuits. The digital electronic circuits may be configured or programmed to filter the digital signal or data by utilizing fast Fourier transforms (FFTs), finite impulse response (FIR) filters, infinite impulse response (IIR) filters, or the like, or combinations thereof.

The construction of the high pass filter 16 may be determined or chosen to shape the response of the first sensor 12 to be complemental to the response of the second sensor 14. In the analog domain, the architecture of the analog electronic circuits and the values of the components used therein, such as the values of C and R in the exemplary high pass filter 16 circuit of FIG. 3, may be determined or chosen to have a filter time constant (e.g., $\tau=RC$) that may match or roughly be equivalent to the time constant of the response of the second sensor 14. In the digital or discrete time domain, the values of digital filter coefficients and other parameters used in digital electronic circuits may be chosen likewise such that the filter time constant matches the second sensor 14 time constant.

In various embodiments, the high pass filter 16 may taper the response of the first sensor 12 by multiplying a feedback signal from the high pass filter 16 by an exponential function. The multiplication may be performed by opamp-based analog multiplier circuits. In the digital or discrete time domain, the signal from the first sensor 12 may be filtered by an exponential function, $e^{-sn}$, wherein n is the sample number. The value of s may be determined by, or vary according to, a rate $f_s$ at which the input signal is sampled and the time constant $\tau_B$ of the second sensor 14, given by the equation:

$$s = \frac{1}{\tau_B \times f_s} \qquad \text{EQ. 1}$$

For example, if the sampling rate $f_s$ is 1 kilohertz (kHz) and the time constant $\tau_B$ of the second sensor 14 is 8 seconds, then the s value should be set to $1/1000 \times 8 = 1/8000$, so that the filtering attenuation of the signal from the first sensor 12 matches the response of the second sensor 14. The filtering of the signal from the first sensor 12 may be implemented using the following recursive discrete time equation:

$$Y(n)=Y(n-1)*e^{-s}+[x(n+1)-x(n)] \qquad \text{EQ. 2}$$

wherein $Y(n-1)$ is the previous output of the high pass filter 16, $x(n+1)$ is the next sampled input, and $x(n)$ is the current sampled input from the first sensor 12. Y(n) is the output of the high pass filter 16 which is the filtered version of the sensor signal from the first sensor 12.

Figure 4:
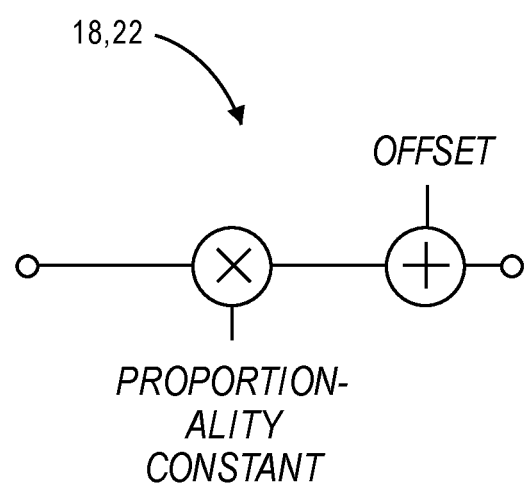
FIG. 4 is an electrical schematic of an exemplary scaler.

The first scaler 18 may amplify, attenuate, shift, and/or otherwise modify an electronic signal. In some embodiments, the first scaler 18 may include passive and/or active electronic components that form analog circuitry such as amplifiers, level shifters, DC offsets, or the like. In other embodiments, the first scaler 18 may include digital electronic circuits similar to those mentioned above. A simple example of the first scaler 18, as shown in FIG. 4, may include a multiplier and an adder. The multiplier and adder may be implemented using analog circuitry or DSP techniques in the digital domain. Inputs to the multiplier include the signal to be scaled and a proportionality constant. Inputs to the adder include the output of the multiplier and an offset. In the analog domain, the proportionality constant and the offset may be electrical voltages or currents, while in the digital domain, the proportionality constant and the offset may be numerical values. The output of the adder may be the input signal amplified, or attenuated, by the proportionality constant and shifted by the offset.

The low pass filter 20 may optionally be utilized to remove any fast responses or high frequency noise from the output of the second sensor 14. The low pass filter 20 generally passes input electronic signals with frequency components less than a cutoff frequency to its output, while cutting off or attenuating input electronic signals with frequency components greater than the cutoff frequency. In the alternative, the low pass filter 20 passes changes in the level or value of the input electronic signal with transition times that are greater than a filter time constant, while cutting off or attenuating input electronic signal changes with transition times less than the filter time constant. In various embodiments, the low pass filter 20 may have a filter time constant $\tau$ that is roughly the same as the time constant $\tau_B$ of the second sensor 14. Like the high pass filter 16, the low pass filter 20 may include analog electronic circuits in some embodiments and digital electronic circuits in other embodiments. Furthermore, the function of the low pass filter 20 may be implemented by filtering the input signal by an exponential function. The discrete time equation to implement the filtering is shown below:

$$Y(n)=Y(n-1)+[x(n)-Y(n-1)]*(1-e^{-s}) \qquad \text{EQ. 3}$$

wherein Y(n−1) is the previous output of the low pass filter 20, x(n+1) is the next sampled input, and x(n) is the current sampled input from the second sensor 14. Y(n) is the output of the low pass filter 20 which is the filtered version of the sensor signal from the second sensor 14.

The second scaler 22 may be substantially the same in structure and function as the first scaler 18.

The summation unit 24 generally adds the values or levels of its two input signals. In some embodiments, the summation unit 24 may include discrete and/or active components that form analog electronic circuits, such as summing amplifiers or mixers, which add levels of electrical voltage or current. In other embodiments, the summation unit 24 may include digital electronic circuits which add values of digital signals or digital data. In all embodiments, the summation unit 24 outputs a value or level that is the sum of the two input signals.

The sensor system 10 may have a construction as follows. The output of the first sensor 12 may be coupled to the input of the high pass filter 16 whose output may be coupled to the input of the first scaler 18. The output of the first scaler 18 may be coupled to a first input of the summation unit 24. The output of the second sensor 14 may be coupled to the input of the low pass filter 20 whose output may be coupled to the input of the second scaler 22, if the low pass filter 20 is included. If not, then the output of the second sensor 14 may be coupled to the input of the second scaler 22. The output of the second scaler 22 may be coupled to a second input of the summation unit 24. The output of the summation unit 24 may also be the output of the sensor system 10.

The sensor system 10 may operate as follows. The parameter (temperature, humidity, analyte, etc.) to be sensed may be introduced or exposed to the inputs of the first sensor 12 and the second sensor 14. The first sensor 12 may output or communicate a first sensed signal to the high pass filter 16, which shapes the response of the first sensor 12 to be complemental to the response of the second sensor 14 by allowing the fast time response, or high frequency components, of the first sensor 12 to pass, while attenuating or cutting off any slow time responses, or low frequency components. The high pass filter 16 may output or communicate the filtered signal from the first sensor 12 to the first scaler 18, which may amplify, attenuate, and/or level shift the filtered signal from the first sensor 12 to match the values of the parameter (temperature, humidity, analyte, etc.) that is being sensed, to match the level of the signal from the second sensor 14, or to meet industry or international standards. The first scaler 18 may output or communicate the scaled, filtered signal from the first sensor 12 to the summation unit 24.

If the low pass filter 20 is included, then the second sensor 14 may output or communicate a second sensed signal to the low pass filter 20, which allows the slow time response, or low frequency components, of the first sensor 12 to pass, while attenuating or cutting off any fast time responses, or high frequency components. And, the low pass filter 20 outputs or communicates the filtered signal from the second sensor 14 to the second scaler 22. Otherwise, the second sensor 14 may output or communicate the second sensed signal to the second scaler 22. The second scaler 22 may amplify, attenuate, and/or level shift the signal from either the low pass filter 20 or the second sensor 14 to match the values of the parameter that is being sensed, to match the level of the signal from the first sensor 12, or to meet industry or international standards. The second scaler 22 may output or communicate the scaled (optionally filtered) signal from the second sensor 14 to the summation unit 24. The summation unit 24 may add, sum, or mix the scaled, filtered signal from the first sensor 12 and the scaled (optionally filtered) signal from the second sensor 14. The output of the summation unit 24, also the output of the sensor system 10, may be the sum of the adjusted responses of the two sensors, which combines the quick response of the first sensor 12 and the slower, accurate response of the second sensor 14. The time constant of the sensor system 10 may be the time constant $\tau_A$ from the first sensor 12, and the accuracy and hysteresis may be provided by the second sensor 14. The output of the sensor system 10 may be displayed on a device screen or an equipment monitor, may be transmitted to external devices or systems, or may be recorded for future reference.

The time response of the sensor system 10, as well as the high-pass filtered output of the first sensor 12 and the unfiltered output of the second sensor 14, to a step change in the value of the parameter to be measured is shown in FIG. 5, wherein the parameter is assumed to change to a value of 1 at time equal 0 seconds. It can be seen that the signal from the second sensor 14 rises slowly, due to the sensor's intrinsic physical characteristics, to ultimately settle at a value of approximately 1. On the other hand, the filtered output of the first sensor 12 rises quickly to a value of 1, but then the high pass filter 16 attenuates or tapers the output to settle at value of approximately 0 at roughly the same rate as the output of the second sensor 14 rises to the value of 1. The resulting sum of the two signals may always be approximately 1.

In the frequency domain, the sensor system signal processor 26 may operate as follows. The signals from the first sensor 12 and the second sensor 14 may each be converted to the frequency domain by implementing an FFT or other transforms. The response $R_A$ of the first sensor 12 may be filtered with a high pass filter transfer function $h_{HP}(\omega)$. The response $R_B$ of the second sensor 14 may optionally be filtered with a low pass filter transfer function $h_{LP}(\omega)$. The filter transfer functions $h_{HP}(\omega)$ and $h_{LP}(\omega)$ may be implemented by analog electronic circuitry, digital electronic circuitry, or a combination of both. The two signals may be scaled and added together, and the sum may be converted back to the time domain, using an inverse Fourier transform, to provide the output of the sensor system signal processor 26, which is also the output of the sensor system 10. A plot of the frequency response of the sensor system 10, as well as the high-pass filtered output of the first sensor 12 and the unfiltered output of the second sensor 14, is shown in FIG. 6, wherein the sensor system 10 output is the sum of the higher frequency components of the first sensor 12 and the lower frequency components of the second sensor 14.

In some embodiments of the sensor system 10, all functions of the components discussed above which form the sensor system signal processor 26 may be implemented in the discrete time digital domain. In such embodiments, the sensor system signal processor 26 may include signal processing components such as microprocessors, microcontrollers, DSPs, FPGAs, digital ASICs, or the like, or combinations thereof, as well as ADCs. The signal processing may be performed using software, firmware, or combinations of both. The outputs of the first and second sensors 12, 14 may be sampled with one or more ADCs. The signal or sampled data from either sensor may be converted to the appropriate units before further processing, wherein the conversion may be performed before or after sampling. And, conversion is typically performed using the thermal coefficient of resistance (TCR) or the slope of the output response from the sensor. In addition, environmental values of the parameter to be sensed may be equivalent to m×Vsig, wherein m is a proportionality constant and Vsig is the output signal from the sensor. The discrete time output of the sensor system 10 may be given by the following equation:

$$SS(n)=Y1(n)+Y2(n) \qquad \text{EQ. 4}$$

wherein SS(n) is the output of the sensor system signal processor 26 and the output of the sensor system 10, Y1(n) is the filtered output of the first sensor 12 which may be determined or calculated using EQ. 2, and Y2(n) is the output of the second sensor 14 which may be unfiltered, or optionally filtered using EQ. 3.

Referring to FIG. 7, a second embodiment of a sensor system 100 is shown. The sensor system 100 may broadly comprise a first sensor 110, a second sensor 112, a first wide band amplifier 114, a high pass filter 116, a narrow band amplifier 118, a first ADC 120, a first scaler 122, a second wide band amplifier 124, a second ADC 126, a second scaler 128, and a summation unit 130. The first wide band amplifier 114, the high pass filter 116, the narrow band amplifier 118, the first ADC 120, the first scaler 122, the second wide band amplifier 124, the second ADC 126, the second scaler 128, and the summation unit 130 may also form a sensor system signal processor 132.

The first sensor 110 is generally configured to sense environmental parameters, such as temperature, humidity, and/or analytes. As compared with the single mode (response) of the first sensor 12, the first sensor 110 may be a multimode sensor which outputs an electronic signal that has a plurality of responses, $R_A$, each response $R_A$ indicated by a different time constant, $\tau_A$. For example, a first response $R_{A1}$ of the first sensor 110 may have a first time constant of $\tau_{A1}$, a second response $R_{A2}$ may have a second time constant of $\tau_{A2}$, and so forth, such that the last response $R_{AN}$ has a last time constant of $\tau_{AN}$. Furthermore, $\tau_{A1} < \tau_{A2} < \ldots < \tau_{AN}$. In exemplary embodiments, the time constant, $\tau_{A1}$, has a value of less than 1 second, more preferably less than 0.5 second, and even more preferably less than 50 milliseconds. And, the other time constants, $\tau_{A2}, \ldots, \tau_{AN}$, have a value that is preferably at least 1 second greater than $\tau_{A1}$, more preferably at least 5 seconds greater, and even more preferably at least 10 seconds greater.

The circuitry to approximate or model the behavior of the first sensor 110 is shown in FIG. 8. The circuitry may include a first response block with a first resistor-capacitor (RC) low pass filter receiving an environmental signal and communicating the filtered signal to a first multiplier which multiplies the filtered signal by a first proportionality constant. The first response block may output a first electronic signal with a first response $R_{A1}$ indicated by a first time constant $\tau_{A1}$. The circuitry may include a second response block similar to the first response block, but with different values for R and C of the low pass filter and a different proportionality constant. The second response block may output a second electronic signal with a second response $R_{A2}$ indicated by a second time constant $\tau_{A2}$. The two filtered signals may be added together and then added to an offset. Thus, the output response of the first sensor 110 may include the two responses $R_{A1}$, $R_{A2}$ with the two time constants $\tau_{A1}$, $\tau_{A2}$.

In various embodiments, the second sensor 112 may be substantially the same in structure and function as the second sensor 14. The circuitry to approximate or model the behavior of the second sensor 112 is shown in FIG. 9. The circuitry may include a single response block substantially similar to the response blocks described above for the first sensor 110. The output response of the second sensor 112 may include the response $R_B$ with the time constant $\tau_B$.

The first wide band amplifier 114 generally amplifies an input electronic signal and may include passive and active electronic components that form single stage or multi-stage amplifier circuits. The first wide band amplifier 114 may be configured to amplify signals that include a wide range of frequency components.

The high pass filter 116 may be substantially the same in structure and function as the high pass filter 16.

The narrow band amplifier 118 may be substantially similar to the first wide band amplifier 114, except that the narrow band amplifier 118 may be configured to amplify electronic signals that include only a narrow range of frequency components, as compared with the first wide band amplifier 114.

The first ADC 120 generally converts an analog electronic signal to a digital electronic signal. The first ADC 120 may include electronic circuits with architectures such as direct conversion, successive approximation, or the like to convert an analog voltage or current to a multibit digital voltage output, which may be serialized, with a value that corresponds to the level of the input signal.

The first scaler 122 may be substantially the same in structure and function as the first scaler 18. The second ADC 126 may be substantially the same in structure and function as the first ADC 120. The second scaler 128 may be substantially the same in structure and function as the first scaler 122. In addition, the summation unit 130 may be substantially the same in structure and function as the summation unit 24.

The sensor system 100 may have a construction as follows. The output of the first sensor 110 may be coupled to the input of the first wide band amplifier 114 whose output may be coupled to the input of the high pass filter 116. The output of the high pass filter 116 may be coupled to the input of the narrow band amplifier 118 whose output may be coupled to the input of the first ADC 120. The output of the first ADC 120 may be coupled to the input of the first scaler 122 whose output may be coupled to a first input of the summation unit 130. The output of the second sensor 112 may be coupled to the input of the second wide band amplifier 124 whose output may be coupled to the input of the second ADC 126. The output of the second ADC 126 may be coupled to the input of the second scaler 128 whose output may be coupled to a second input of the summation unit 130. The output of the summation unit 130 may also be the output of the sensor system 100.

The sensor system 100 may operate as follows. The parameter (temperature, humidity, analyte, etc.) to be sensed may be introduced or exposed to the inputs of the first sensor 110 and the second sensor 112. The first sensor 110 may output or communicate a first sensed signal to the first wide band amplifier 114, which amplifies the first sensed signal. The first wide band amplifier 114 may output or communicate the amplified first sensed signal to the high pass filter 116, which shapes the first response $R_{A1}$ with the time constant $\tau_{A1}$ of the first sensor 110 to be complemental to the response $R_B$ of the second sensor 112, while attenuating or cutting off the slower responses with the time constants $\tau_{A2}, \ldots, \tau_{AN}$. The high pass filter 116 may output or communicate the amplified, filtered signal from the first sensor 110 to the narrow band amplifier 118, which may further amplify the filtered signal. The narrow band amplifier 118 may output or communicate the amplified, filtered signal from the first sensor 110 to the first ADC 120, which may sample or digitize the signal. The first ADC 120 may output or communicate the digitized signal to the first scaler 122, which may scale the values of the digitized, amplified, filtered signal from the first sensor 110 to match the values of the parameter (temperature, humidity, analyte, etc.) that is being sensed or to meet a standard. The first scaler 122 may output or communicate the digitized, amplified, filtered signal from the first sensor 110 to the summation unit 130.

The second sensor 112 may output or communicate a second sensed signal to the second wide band amplifier 124, which amplifies the second sensed signal. The second wide band amplifier 124 may output or communicate the amplified signal from the second sensor 112 to the second ADC 126, which may sample or digitize the signal. The second ADC 126 may output or communicate the digitized signal to the second scaler 128, which may scale the values of the digitized, amplified signal from the second sensor 112 to match the values of the parameter that is being sensed or to meet a standard. The second scaler 128 may output or communicate the digitized, amplified, filtered signal from the second sensor 112 to the summation unit 130. The summation unit 24 may add or sum the processed signals from the first and second sensors 110, 112. The output of the summation unit 130, which is also the output of the sensor system 100, may be displayed on a device screen or an equipment monitor, may be transmitted to external devices or systems, or may be recorded for future reference.

In some embodiments of the sensor system 100, all functions of the components discussed above which form the sensor system signal processor 132 may be implemented in the digital domain. The outputs of the first and second sensors 110, 112 may be sampled, such as with the first ADC 120 and the second ADC 126, respectively. The outputs may be sampled after they have been amplified or not. The output of the first sensor 110 may be filtered by an exponential function to properly attenuate it to match the time constant $\tau_B$ of the second sensor 112. The filtered response of the first sensor 110 is given by the equation:

$$Y1(n)=Y1(n-1)*e^{-s}+K\times[x(n+1)-x(n)] \qquad \text{EQ. 5}$$

wherein $Y1(n-1)$ is the previous high pass filtered value, K is a proportionality constant, $x(n+1)$ is the next sampled input, and $x(n)$ is the current sampled input from the first sensor 110. s may vary according to the sampling frequency $f_s$ and the second sensor 112 time constant $\tau_B$. s may be determined by using EQ. 1. (In the event of the second sensor 112 having different response and recovery times, the value of s may be changed to reflect a response or recovery state of the second sensor determined by the slope of $R_B$, positive or negative, correcting for signal mixing error due to different response and recovery times.) $Y1(n)$ is the current high pass filtered value from the first sensor 110. Similar to the sensor system 10 given in EQ. 4, the output of the sensor system signal processor 132 may be the sum of the filtered response of the first sensor 110, $Y1(n)$ from EQ. 5, and the response from the second sensor 112.

In addition, the sensor system signal processor 132 may operate in the frequency domain as described above for the sensor system signal processor 26. High pass and optional low pass filter transfer functions may be implemented for the sampled signals from the first and second sensors 110, 112, with the result being substantially the same as for the sensor system signal processor 26.

Referring to FIG. 10, a third embodiment of a sensor system 200 is shown. The sensor system 200 may be substantially similar to the sensor system 100 except that the sensor system 200 excludes a second sensor. Thus, the sensor system 200 may broadly comprise a first sensor 210, a first wide band amplifier 214, a high pass filter 216, a narrow band amplifier 218, a first ADC 220, a first scaler 222, a second wide band amplifier 224, a second ADC 226, a second scaler 228, and a summation unit 230—all substantially the same as the like-named components described above. In addition, a sensor system signal processor 232 may be substantially the same as the sensor system signal processor 132. As compared with the sensor system 100, the sensor system 200 may result in smaller product packaging.

The sensor system 200 may have a construction as follows. The output of the first sensor 210 may be coupled to the input of the first wide band amplifier 214 and the input of the second wide band amplifier 224. The remaining construction may be substantially the same as for the sensor system 100.

The sensor system 200 may operate as follows. The first sensor 210 provides both the fast response with time constant $\tau_{A1}$ and the slow response with time constant $\tau_{A2}$. The fast response may be filtered and scaled through the first wide band amplifier 214, the high pass filter 216, the narrow band amplifier 218, the first ADC 220, and the first scaler 222. The slow response may be scaled through the second wide band amplifier 224, the second ADC 226, and the second scaler 228. The filtered fast response and the slow response may be added as described above for the sensor system 100, resulting in substantially the same output. In addition, the sensor system 200 may operate in the digital discrete time domain and in the frequency domain in substantially the same manner as for the sensor system 100.

At least a portion of the steps of a method 300 of processing signals from environmental sensors in accordance with various embodiments of the current invention is shown in FIG. 11. The steps may be performed in the order shown in FIG. 11, or they may be performed in a different order. Furthermore, some steps may be performed concurrently as opposed to sequentially. In addition, some steps may be optional.

Referring to step 301, a first electronic signal from a first environmental sensor 12 is received. The first sensor 12 may be configured to sense environmental parameters, such as temperature, humidity, and/or analytes, and, in response, output an electronic signal with an electrical voltage or electrical current that quickly corresponds to the behavior of, or changes in, the parameter. The first sensor 12 may be what is considered a very fast sensor, with a response $R_A$ indicated by a first time constant $\tau_A$ with a value that is preferably less than 1 second, more preferably less than 0.5 second, and even more preferably less than 50 milliseconds.

Referring to step 302, a second electronic signal from a second environmental sensor 14 is received. The second sensor 14 may be configured to sense environmental parameters and, in response, output an electronic signal with an electrical voltage or electrical current that more slowly corresponds to the behavior of, or changes in, the parameter. Compared with the first sensor 12, the second sensor 14 may be considered a slow sensor, with a response $R_B$ indicated by a second time constant $\tau_B$ with a value that is preferably between approximately 0.5 second and approximately 30 hours, more preferably between approximately 1 second and approximately 30 minutes, and even more preferably between approximately 5 seconds and approximately 10 seconds. In other words, the time constant of the second sensor 14 is greater than the time constant of the first sensor 12.

Referring to step 303, the first electronic signal is high pass filtered with a high pass filter 16. The high pass filter 16 generally passes input electronic signals with time constants less than a filter time constant, while cutting off or attenuating input electronic signals with time constants greater than the filter time constant. In the alternative, the high pass filter 16 passes input electronic signals with frequency components greater than a cutoff frequency to its output, while cutting off or attenuating input electronic signals with frequency components less than the cutoff frequency. The high pass filter 16 may be constructed from analog or digital electronic circuits which may be formed to have a filter time constant roughly equal to the second time constant.

In various embodiments, the high pass filter 16 may taper the response of the first sensor 12 by multiplying a filter feedback signal by an exponential function. The multiplication may be performed by opamp-based analog multiplier circuits. In the digital or discrete time domain, the signal from the first sensor 12 may be filtered by $e^{-sn}$. The value of s may be determined by, or vary according to, a rate $f_s$ at which the input signal is sampled and the time constant $\tau_B$ of the second sensor 14, given by EQ. 1. For example, if the sampling rate $f_s$ is 1 kilohertz (kHz) and the time constant $\tau_B$ of the second sensor 14 is 8 seconds, then the s value should be set to 1/1000×8=1/8000, so that the filtering attenuation of the signal from the first sensor 12 matches the response of the second sensor 14. The filtering of the signal from the first sensor 12 may be implemented using EQ. 2.

The operations of EQ. 2 may be implemented with the following substeps. The first electronic signal may be sampled during a plurality of time periods to create a stream of first electronic signal samples, one first electronic signal sample per time period. A current time period first electronic signal sample may be subtracted from a next time period first electronic signal sample to create a first electronic signal sample difference for each time period. A current time period filtered first electronic signal sample may be generated by multiplying a previous time period filtered first electronic signal sample by an exponential function and adding the product to the first electronic signal sample difference for each time period.

In alternative embodiments, the time domain first electronic signal may be transformed into the frequency domain before it is filtered. The transformation may be implemented using a Fourier transform such as a fast Fourier transform (FFT). The first electronic signal may then be filtered with a high pass filter transfer function $h_{HP}(\omega)$. The result may be a frequency domain filtered first electronic signal.

Referring to step 304, the second electronic signal is optionally low pass filtered with a low pass filter 20. The low pass filter 20 generally passes input electronic signals with frequency components less than a cutoff frequency to its output, while cutting off or attenuating input electronic signals with frequency components greater than the cutoff frequency. The low pass filter 20 may be constructed from analog or digital electronic circuits which may be formed to have a filter time constant roughly equal to the second time constant.

In alternative embodiments, the time domain second electronic signal may be transformed into the frequency domain, using an FFT or the like, before it is optionally filtered. The second electronic signal may then be filtered with a low pass filter transfer function $h_{LP}(\omega)$. The result may be a frequency domain second electronic signal, if the signal is not filtered, or a frequency domain filtered second electronic signal, if the signal is filtered.

Referring to step 305, the filtered first electronic signal and the second electronic signal are scaled. The scaling may be performed by first and second scalers 18, 22 which each may amplify, attenuate, shift, and/or otherwise modify an electronic signal. The scalers 18, 22 may each be constructed from analog or digital electronic circuits which multiply the signal by a proportionality constant and add the result to an offset. The signals may be scaled to match the values of the environmental parameter (temperature, humidity, analyte, etc.) that is being sensed or to meet industry or international standards.

In alternative embodiments, the frequency domain signals may be scaled as well—producing a frequency domain scaled, filtered first electronic signal and a frequency domain scaled second electronic signal.

Referring to step 306, the scaled, filtered first electronic signal and the scaled second electronic signal are added together. The addition may be performed by a summation unit 24 which generally adds the values or levels of its two input signals. The summation unit 24 may be constructed from analog or digital electronic circuits. The sum produced by the summation unit 24 may be a fast and accurate representation of the behavior of the environmental parameter to be sensed.

In alternative embodiments, the frequency domain scaled, filtered first electronic signal and scaled second electronic signal may be added together. The sum of the two signals may then be converted back to the time domain, using an inverse Fourier transform, before the sum is communicated to other systems or devices.

In some embodiments, the steps of the method 300 may be performed by the components of sensor system 10 discussed above. In other embodiments, the steps of the method 300 may be performed by the sensor system signal processor 26.

At least a portion of the steps of a method 400 of processing signals from environmental sensors in accordance with additional embodiments of the current invention is shown in FIGS. 12A and 12B. The steps may be performed in the order shown in FIGS. 12A and 12B, or they may be performed in a different order. Furthermore, some steps may be performed concurrently as opposed to sequentially. In addition, some steps may be optional.

Referring to step 401, a first electronic signal from a first environmental sensor 110 is received. The first sensor 110 may be configured to sense environmental parameters, such as temperature, humidity, and/or analytes, and, in response, output an electronic signal with an electrical voltage or electrical current that quickly corresponds to the behavior of, or changes in, the parameter. The first sensor 110 may be a multimode sensor which outputs an electronic signal that has a plurality of responses, $R_A$, each response $R_A$ indicated by a different time constant, $\tau_A$. For example, a first response $R_{A1}$ of the first sensor 110 may have a first time constant of $\tau_{A1}$, a second response $R_{A2}$ may have a second time constant of $\tau_{A2}$, and so forth, such that the last response $R_{AN}$ has a last time constant of $\tau_{AN}$. Furthermore, $\tau_{A1} < \tau_{A2} < \ldots < \tau_{AN}$. In exemplary embodiments, the time constant, $\tau_{A1}$, has a value of less than 1 second, more preferably less than 0.5 second, and even more preferably less than 50 milliseconds. And, the other time constants, $\tau_{A2}, \ldots, \tau_{AN}$, have a value that is preferably at least 1 second greater than $\tau_{A1}$, more preferably at least 5 seconds greater, and even more preferably at least 10 seconds greater.

Referring to step 402, a second electronic signal from a second environmental sensor 112 is received. The second sensor 112 may be configured to sense environmental parameters and, in response, output an electronic signal with an electrical voltage or electrical current that more slowly corresponds to the behavior of, or changes in, the parameter. Compared with the first sensor 110, the second sensor 112 may be considered a slow sensor, with a response $R_B$ indicated by a second time constant $\tau_B$ with a value that is preferably between approximately 0.5 second and approximately 30 hours, more preferably between approximately 1 second and approximately 30 minutes, and even more preferably between approximately 5 seconds and approximately 10 seconds. In other words, the time constant of the second sensor 112 is greater than the time constant of the first sensor 110.

Referring to step 403, the first electronic signal is amplified with a first wide band amplifier 114. The first wide band amplifier 114 generally amplifies an input electronic signal and may include passive and active electronic components that form single stage or multi-stage amplifier circuits. The first wide band amplifier 114 may be configured to amplify signals that include a wide range of frequency components.

Referring to step 404, the first electronic signal is high pass filtered with a high pass filter 116. The high pass filter 116 generally passes input electronic signals with time constants less than a filter time constant, while cutting off or attenuating input electronic signals with time constants greater than the filter time constant. In the alternative, the high pass filter 116 passes input electronic signals with frequency components greater than a cutoff frequency to its output, while cutting off or attenuating input electronic signals with frequency components less than the cutoff frequency. The high pass filter 116 may be constructed from analog or digital electronic circuits which may be formed to have a filter time constant roughly equal to the second time constant.

In various embodiments, the high pass filter 116 may taper the response of the first sensor 110 by multiplying the first sensor 110 output by an exponential function. The multiplication may be performed by opamp-based analog multiplier circuits. In the digital or discrete time domain, the signal from the first sensor 12 may be multiplied by $e^{-sn}$. The value of s may be determined by, or vary according to, a rate $f_s$ at which the input signal is sampled and the time constant $\tau_B$ of the second sensor 112, given by EQ. 1. For example, if the sampling rate $f_s$ is 1 kilohertz (kHz) and the time constant $\tau_B$ of the second sensor 14 is 8 seconds, then the s value should be set to $1/1000 \times 8 = 1/8000$, so that the filtering attenuation of the signal from the first sensor 110 matches the response of the second sensor 112. The multiplication of the signal from the first sensor 110 may be implemented using EQ. 2.

Referring to step 405, the filtered first electronic signal is amplified with a narrow band amplifier 118. The narrow band amplifier 118 may be substantially similar to the first wide band amplifier 114, except that the narrow band amplifier 118 may be configured to amplify electronic signals that include only a narrow range of frequency components, as compared with the first wide band amplifier 114.

Referring to step 406, the filtered, amplified first electronic signal is converted from analog to digital by a first ADC 120. The first ADC 120 generally converts an analog electronic signal to a digital electronic signal.

Referring to step 407, the filtered, amplified, digital first electronic signal is scaled. The scaling may be performed by a first scaler 122 which may amplify, attenuate, shift, and/or otherwise modify an electronic signal. The first scaler 122 may each be constructed from analog or digital electronic circuits which multiply the signal by a proportionality constant and add the result to an offset. The signals may be scaled to match the values of the environmental parameter (temperature, humidity, analyte, etc.) that is being sensed or to meet industry or international standards.

Referring to step 408, the second electronic signal is amplified with a second wide band amplifier 124. The second wide band amplifier 124 generally amplifies an input electronic signal and may include passive and active electronic components that form single stage or multi-stage amplifier circuits. The second wide band amplifier 124 may be configured to amplify signals that include a wide range of frequency components.

Referring to step 409, the amplified second electronic signal is converted from analog to digital by a second ADC 126. The second ADC 126 generally converts an analog electronic signal to a digital electronic signal.

Referring to step 410, the amplified, digital second electronic signal is scaled. The scaling may be performed by a second scaler 128 which may amplify, attenuate, shift, and/or otherwise modify an electronic signal. The second scaler 128 may each be constructed from analog or digital electronic circuits which multiply the signal by a proportionality constant and add the result to an offset. The signals may be scaled to match the values of the environmental parameter that is being sensed or to meet industry or international standards.

Referring to step 411, the amplified, filtered, digital, scaled first electronic signal and the amplified, digital, scaled second electronic signal are added together. The addition may be performed by a summation unit 130 which generally adds the values or levels of its two input signals. The summation unit 130 may be constructed from analog or digital electronic circuits. The sum produced by the summation unit 130 may be a fast and accurate representation of the behavior of the environmental parameter to be sensed.

The current invention may provide an additional method 500 of processing signals from an environmental sensor. The steps of the method 500 are substantially similar to the steps of the method 400, except that the first and second electronic signals are each received from a first sensor 210. The first sensor 210 may be a multimode sensor which outputs an electronic signal that has at least two responses, $R_A$, each response $R_A$ indicated by a different time constant, $\tau_A$. For example, a first response $R_{A1}$ of the first sensor 210 may have a first time constant of $\tau_{A1}$ while a second response $R_{A2}$ may have a second time constant of $\tau_{A2}$. Thus, the second step of the method 500 may include receiving the first electronic signal with a second response having a second time constant greater than the first time constant. Otherwise, the remaining steps of the method 500 may be substantially the same as the steps of the method 400 and may produce the same result.

At least a portion of the steps of a method 600 for processing electronic signals from temperature sensors is shown in FIG. 13. The steps may be performed in the order shown in FIG. 13, or they may be performed in a different order. Furthermore, some steps may be performed concurrently as opposed to sequentially. In addition, some steps may be optional.

Referring to step 601, a sequence of first sensor temperature values and a sequence of second sensor temperature values are received. One first sensor temperature value and one second sensor temperature value are received for each of a plurality of time periods. Thus, the first sensor temperature values may be time sampled (one sample per time period) temperature values and may have the form T1[$n$], where n ranges from time period 0 to time period m. And, the second sensor temperature values may be time sampled temperature values and may have the form T2[$n$], where n ranges from time period 0 to time period m.

In some embodiments, the first sensor temperature values may be received from a temperature sensor such as the first sensor 12, wherein the first sensor 12 senses temperature and outputs a sequence of temperature values. In other embodiments, the first sensor temperature values may be derived from a signal from a temperature sensor that output an electrical resistance as the signal. The temperature values may be calculated from the following equation:

$$T=(R-y_{int})/\text{TCR} \qquad \text{EQ. 6}$$

wherein T is the temperature value, R is the measured electrical resistance from the temperature sensor, $y_{int}$ is the estimated resistance at time=0 seconds, and TCR is the thermal coefficient of resistance for the temperature sensor. TCR may be calculated as −0.0038×ReferenceResistance, and $y_{int}$ may be calculated as ReferenceResistance−ReferenceTemperature×TCR. In all embodiments, the sequence of first sensor temperature values are received or derived from a sensor with a response having a time constant $\tau_A$.

The second sensor temperature values may be received from a temperature sensor such as the second sensor 14, wherein the second sensor 14 senses temperature and outputs a sequence of temperature values. The sensor may generate a response having a time constant $\tau_B$, wherein $\tau_B$ is greater than $\tau_A$ by, for example, at least 1 second.

Referring to step 602, an offset value is set equal to an initial first sensor temperature value minus an initial second sensor temperature value. The offset value may be an array variable, OFFSET[$n$], which has a value for each time period. This step may take the form in the following equation:

$$\text{OFFSET}[0]=T1[0]-T2[0] \qquad \text{EQ. 7}$$

Referring to step 603, an output temperature value is set equal to an initial second sensor temperature value. The output temperature value may be similar in nature to the output of the sensor system 10 in that it represents the combination of the output from two sensors. The output temperature value may be an array variable, OUTPUT[$n$], which has a value for each time period. This step may take the form in the following equation:

$$\text{OUTPUT}[0]=T2[0] \qquad \text{EQ. 8}$$

Referring to step 604, an error value is set equal to the previous time period output temperature value minus the current time period second sensor temperature value for each time period. The error value may be a variable, ERROR, which is not necessarily an array, but whose value is calculated each time period. This step may take the form in the following equation:

$$\text{ERROR}=\text{OUTPUT}[n-1]-T2[n] \qquad \text{EQ. 9}$$

Referring to step 605, the current time period offset value is set equal to the previous time period offset value minus the error value times a proportionality factor for each time period. The proportionality factor, P, is a constant which may control the proportional combining of the first sensor temperature values and the second sensor temperature values. This step may take the form in the following equation:

$$\text{OFFSET}[n]=\text{OFFSET}[n-1]-\text{ERROR}\times P \qquad \text{EQ. 10}$$

Referring to step 606, the current time period output temperature value is set equal to the current time period first sensor temperature value plus the current time period offset value for each time period. This step may take the form in the following equation:

$$\text{OUTPUT}[n]=T1[n]+\text{OFFSET}[n] \qquad \text{EQ. 11}$$

Steps 604-606 may be repeatedly indefinitely and, typically, in the order listed. The steps of the method 600 generally perform single exponential smoothing on the error value and can also be thought of as a digital crossover filter that transmits the high frequency components of first sensor and the low frequency components of second sensor. As mentioned above, the proportionality factor, P, may control the proportional combining of the two sets of temperature values. A smaller value of P may allow the second sensor temperature values to dominate the output temperature values, which suppresses the quick sensor response embedded in the first sensor temperature values and leads to the output temperature values undesirably responding more slowly to changes in the actual temperature. Thus, larger values of P result in a slower combination of the first sensor and second sensor temperature values, particularly with embodiments in which the first sensor temperature values are derived, since the drift in $y_{int}$ is assumed to be slow.

EXAMPLES

The following examples set forth systems and methods provided in accordance with various embodiments of the current invention. Various examples refer to the first sensor 12, 110, 210 as "Sensor A". Various examples refer to the second sensor 14, 112, 212 as "Sensor B". Various examples and figures refer to the sensor system 10, 100, 200 as "hybrid sensor". It is to be understood, however, that these examples are provided by way of illustration and nothing herein should be taken as a limitation upon the overall scope of the invention.

Example 1

Fabrication of Integrated Temperature and Humidity Sensors

An integrated temperature/analyte sensor was fabricated as in Example 2 of U.S. patent application Ser. No. 14/806,238.

Example 2

Measurement of Humidity Sensor Response $R_{A1}$

A sensor fabricated in Example 1 was tested for its response and recovery time to the introduction of humid air. An experimental setup for measuring the response and recovery time is shown in FIG. 14. Dry and humid (30% relative humidity) air were introduced as 1-second pulses to the sensor, using a solenoid valve (Ingersoll-Rand P251SS120-A-G). The response time (1/e) of the sensor when the humid air was introduced to it and the recovery time when the humid air was replaced by dry air after 1 second are shown in FIG. 15. The response time was <10 milliseconds and the recovery time was about 40 milliseconds.

Example 3

Measurement of Humidity Sensor Response $R_{A2}$

The humidity sensors from Example 1 were tested under controlled relative humidity and temperature inside an environmental chamber (Espec BTL-433 model), in order to evaluate the response to a step in humidity. The humidity sensor was exposed to a step in humidity from ambient (20% RH) to 50% RH at 20° C., measuring the sensor resistance every 15 minutes over a period of 74 hours, as seen in FIG. 16. The second response $R_{A2}$ had a time constant $\tau_{A2}=27.5$ hours.

Example 4

Response of Humidity Sensor to Humidity Ramp

The humidity sensors from Example 1 were tested under controlled relative humidity and temperature inside an environmental chamber (Espec BTL-433 model), in order to evaluate their hysteresis and accuracy. For hysteresis and accuracy tests of H-sensors, the relative humidity inside the chamber was ramped from 25% to 80%, and then back to 25% at fixed temperature of 25° C. For each test, the output current from each sensor was measured at fixed voltage (V=0.5 V). Two commercially available reference humidity sensors (Honeywell, NIH-4000) were used for measuring relative humidity inside the chamber. The relative humidity profiles of the chamber, recorded by the reference sensors are shown in FIG. 17 (solid line). The observed hysteresis is the result of the two independent responses of the humidity sensor to the environmental humidity signal.

Example 5

Two-Sensor System Signal Processing by Analog Signal Conditioning

The system of FIG. 7 was implemented using a humidity sensor of Example 1 as Sensor A and Sensirion SHT21S as Sensor B, mounted side by side on a printed circuit board, creating a two-sensor system. The signal conditioning circuit schematic used for this implementation is given in FIG. 18, and data acquisition was done using a LabJack U3-LV. A humidity step was created from ambient conditions (20° C., 56% RH) to 20° C., 90% RH by inserting the two-sensor system into an environmental chamber (Associated Environmental BHD-503 model) equilibrated to 20° C., 85% RH. The output of two-sensor system is shown in FIG. 19 and compared to the output of only Sensor B, the Sensirion SHT21S.

Example 6

Two-Sensor System Signal Processing by Digital Signal Conditioning

The system of FIG. 7 was implemented using a humidity sensor of Example 1 as Sensor A and a Honeywell HIH-4000 as Sensor B mounted side by side on a printed circuit board, creating a two-sensor system. The signal conditioning circuit schematic used for this implementation is shown in FIG. 20, and data acquisition and processing was done using a LabJack U3-LV and Python. The step response and recovery of both the HIH-4000 and two-sensor system outputs were demonstrated by creating a humidity step from ambient conditions (20° C., 45% RH) to 20° C., 75% RH and from 20° C., 75% RH to 20° C., 45% RH by inserting or removing the two-sensor system into or out of an environmental chamber (Associated Environmental BHD-503 model) equilibrated to 20° C., 85% RH. The response and recovery output of the two-sensor system takes on the response and recovery time of Sensor A, as shown in FIGS. 21 and 22, respectively, and is significantly faster than the control output of the HIH-4000 sensor (Sensor B) alone. The response of Sensor A is scaled with a hardware gain of ~5.5 and an additional software gain of 3.13 to amplitude match the signal with that of Sensor B. The amplitude-matched signal of Sensor A is high-pass filtered in software with a time constant matching that of Sensor B and added to the signal of Sensor B, yielding a sensor system output with the speed of Sensor A and the accuracy of Sensor B. The response and recovery of the hybrid sensor to a transient humidity signal generated by human speech is shown in FIG. 23, where the signals of Sensors A and B are treated as described above. The fine features of the transient humidity signal are detected by the two-sensor system, but are not present in the output of only the control HIH-4000 sensor (Sensor B).

Example 7

Two-Sensor System with Alternative Algorithm Processing Rapid Fluctuations

A temperature sensor from Example 1 was read alongside a HTU21 (Measurement Specialties, Hampton, Va.) temperature sensor. The two sensors were then breathed on 3 times in repetition, a short break, and then 3 more times in repetition. The HTU21 sensor was too slow to respond to the breathing and held at room temperature with a slight increase. The faster sensor from Example 1 ("Carbon Sensor" in FIG. 24) responded quickly, but the apparent hysteresis did not allow it to return to a reasonable value between breaths. The signal of the two sensors was combined using the alternative algorithm defined above, giving a signal with the stability of the slower sensor while exhibiting the fast fluctuations of the faster sensor.

Example 8

Two-Sensor System with Alternative Algorithm Processing Rapid Fluctuations

A temperature sensor from Example 1 was read alongside a HTU21 temperature sensor. The two sensors were then breathed on with one long exhale. The HTU21 sensor showed only a slight increase in temperature, missing the large initial temperature increase. The faster sensor from Example 1 ("Carbon Sensor" in FIG. 25) responded quickly, but the apparent hysteresis did not allow it to return to room temperature quickly. The signal of the two sensors was combined using the alternative algorithm defined above, giving a signal with the rapid initial increase of the faster sensor, but less hysteresis.

Example 9

Two-Sensor System with Alternative Algorithm Processing Under Flex Stress

A temperature sensor from Example 1 was read alongside a HTU21 temperature sensor. The substrate on which the sensors were mounted was then flexed. The HTU21 sensor did not show a change in output. The sensor from Example 1 ("Carbon Sensor" in FIG. 26) showed large variations in its output, even though the temperature remained constant. Though the "carbon sensor" never recovers, the combined output eventually returns to the true value. This is because the algorithm acts as a high-pass filter on the carbon sensor output. By tuning the proportionality constant in the algorithm, the recovery could be faster, but this would also allow short-term changes in the HTU21 sensor to affect the combined signal. At the end of the test, the two sensors were breathed on several more times. Although the absolute value of the faster sensor output is incorrect, the amplitude of its response is still approximately correct, allowing the combined output to read correctly.

Example 10

Two-Sensor System for Moisture Sensing

A HTU21 sensor and an InFlect™ Moisture Sensor (Brewer Science, Inc., Rolla, Mo.) were inserted into a Brewer Science Test Kit. The HTU21 nsensor was placed into its designated receiver and the InFlect™ Moisture Sensor was placed into channel 1 of the test kit. The active regions of each sensor were separated by less than 1 cm. The base resistance of the InFlect™ Moisture Sensor was measured to be 624.1 kΩ and the HTU21 sensor's relative humidity (RH) was measured to be 45% RH. Corresponding calibration values were input into the user interface.

After calibration, the software was configured to log the data of the run time, InFlect™Moisture Sensor derivative ("dH/dT"), HTU21 sensor's RH reading ("3rd Party Hum"), and the hybrid readout of humidity. FIG. 27 shows the data output of each parameter. The sensor was breathed on from a distance to produce a slight change in moisture. In FIG. 28, the graph on the right shows the hybrid readout and the graph on the left shows the HTU21 sensor's readout of RH. The HTU21 sensor provided a reading about every 1 second, while the hybrid readout provided a reading every 0.007 seconds.

Example 11

Two-Sensor System for Temperature Sensing

A HTU21 sensor and an InFlect™Thermistor (Brewer Science, Inc., Rolla, Mo.) were inserted into a Brewer Science Test Kit. The HTU21 sensor was placed into its designated receiver and the InFlect™Thermistor was placed into channel 1 of the test kit. The active regions of each sensor were separated by less than 1 cm. The base resistance of the InFlect™Moisture Sensor was measured to be 662.3 kΩ and the HTU21 sensor's temperature was measured to be 24° C. Corresponding calibration values were input into the user interface.

After calibration, the software was configured to log the data of the run time, InFlect™Thermistor derivative ("BS Temp"), HTU21 sensor's temperature reading ("$3^{rd}$ Party Temp"), and the hybrid readout of temperature. FIG. 29 shows the data output of each parameter. The sensor was breathed on from a distance three times to produce a slight change in temperature. In FIG. 30, the graph on the right shows the hybrid readout and the graph on the left shows the HTU21 sensor's readout of temperature. The HTU21 sensor provided a reading about every 1 second, while the hybrid readout provided a reading every 0.007 seconds.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A sensor system comprising:
   a first sensor configured to sense an environmental parameter and output a first electronic signal with a response to the environmental parameter, the response having a first time constant;
   a second sensor configured to sense the environmental parameter and output a second electronic signal with a response to the environmental parameter, the response having a second time constant greater than the first time constant;
   a high pass filter having a first filter time constant roughly equal to the second time constant, the high pass filter receiving the first electronic signal and outputting a filtered first electronic signal in which changes in a level or value of the first electronic signal with transition times that are less than the first filter time constant are passed, while first electronic signal changes with transition times greater than the first filter time constant are cut off or attenuated; and a summation unit receiving the filtered first electronic signal and the second electronic signal and outputting a third electronic signal which is the sum of the filtered first electronic signal and the second electronic signal.

2. The sensor system of claim 1, further comprising a first scaler receiving the filtered first electronic signal and outputting a filtered, scaled first electronic signal whose levels or values are adjusted to correspond to those of the environmental parameter, and a second scaler receiving the second electronic signal and outputting a scaled second electronic signal whose levels or values are adjusted to correspond to those of the environmental parameter, wherein the summation unit receives the filtered, scaled first electronic signal and the scaled second electronic signal and outputs the third electronic signal being the sum of the filtered, scaled first electronic signal and the scaled second electronic signal.

3. The sensor system of claim 2, wherein the first and second scalers each include a multiplier electronically coupled to an adder, wherein the scaled output electronic signal is a sum of an offset value and a product of an input electronic signal and a proportionality constant.

4. The sensor system of claim 2, further comprising a low pass filter having a second filter time constant roughly equal to the second time constant, the low pass filter receiving the second electronic signal and outputting a filtered second electronic signal in which changes in a level or value of the second electronic signal with transition times that are greater than the second filter time constant are passed, while second electronic signal changes with transition times less than the second filter time constant are cut off or attenuated, wherein the second scaler receives the filtered second electronic signal.

5. The sensor system of claim 1, wherein the first sensor includes a thin-film printed transducer and the second sensor includes a transducer having a bulk sensing area.

6. The sensor system of claim 1, wherein the high pass filter includes a discrete time filter in which the first electronic signal is filtered with an exponential function that varies according to a sampling rate of the first electronic signal and the second time constant.

7. The sensor system of claim 6, wherein the exponential function is $e^{-sn}$, wherein n is the sample number and s is equivalent to one divided by a product of the sampling rate of the first electronic signal and the second time constant.

8. A method of processing signals from environmental sensors, the method comprising the steps of:

receiving a first electronic signal from a first environmental sensor with a response having a first time constant, the first environmental sensor sensing an environmental parameter;

receiving a second electronic signal from a second environmental sensor with a response having a second time constant greater than the first time constant, the second environmental sensor sensing the environmental parameter;

high pass filtering the first electronic signal with a first filter time constant is roughly equal to the second time constant, the high pass filtering producing a filtered first electronic signal; and adding the filtered first electronic signal and the second electronic signal.

9. The method of claim 8, further comprising the steps of scaling the filtered first electronic signal and the second electronic signal such that the levels or values of each signal are adjusted to correspond to those of the environmental parameter, the scaling producing a filtered, scaled first electronic signal and a scaled second electronic signal, and adding the filtered, scaled first electronic signal and the scaled second electronic signal.

10. The method of claim 9, wherein the scaling includes multiplying an input electronic signal by a proportionality constant and adding the product to an offset value.

11. The method of claim 8, wherein the high pass filtering further includes passing changes in a level or value of the first electronic signal with transition times that are less than the filter time constant and cutting off or attenuating first electronic signal changes with transition times greater than the filter time constant.

12. The method of claim 8, further comprising the steps of low pass filtering the second electronic signal with a second filter time constant is roughly equal to the second time constant, the low pass filtering producing a filtered second electronic signal, and adding the filtered first electronic signal and the second electronic signal.

13. The method of claim 12, wherein the low pass filtering further includes passing changes in a level or value of the second electronic signal with transition times that are greater than the second filter time constant and cutting off or attenuating second electronic signal changes with transition times less than the second filter time constant.

14. The method of claim 8, wherein the high pass filtering further includes sampling the first electronic signal during a plurality of time periods to create a stream of first electronic signal samples, one first electronic signal sample per time period, subtracting a current time period first electronic signal sample from a next time period first electronic signal sample to create a first electronic signal sample difference for each time period, and generating a current time period filtered first electronic signal sample by multiplying a previous time period filtered first electronic signal sample by an exponential function and adding the product to the first electronic signal sample difference for each time period.

15. The method of claim 14, wherein the exponential function is $e^{-sn}$, wherein n is the sample number and s is equivalent to one divided by a product of the sampling rate of the first electronic signal and the second time constant.

16. The method of claim 8, further comprising the steps of transforming the first electronic signal and the second electronic signal to the frequency domain to produce a frequency domain first electronic signal and a frequency domain second electronic signal, high pass filtering the first electronic signal with the first filter time constant to produce a frequency domain filtered first electronic signal, scaling the frequency domain filtered first electronic signal and the frequency domain second electronic signal to produce a frequency domain scaled, filtered first electronic signal and a frequency domain scaled second electronic signal, and adding the frequency domain scaled, filtered first electronic signal and the frequency domain scaled second electronic signal.

17. A sensor system comprising:

a first sensor configured to output a sequence of first sensor temperature values;

a second sensor configured to output a sequence of second sensor temperature values; and a signal processor configured to receive the sequence of first sensor temperature values and the sequence of second sensor temperature values, one first sensor temperature value and one second sensor temperature value for each of a plurality of time periods;

set an offset value equal to an initial first sensor temperature value minus an initial second sensor temperature value;

set an output temperature value equal to an initial second sensor temperature value;

set an error value equal to a previous time period output temperature value minus a current time period second sensor temperature value for each time period;

set a current time period offset value equal to a previous time period offset value minus the error value times a proportionality constant for each time period; and set a current time period output temperature value equal to a current time period first sensor temperature value plus the current time period offset value for each time period.

18. The sensor system of claim 17, wherein the first sensor temperature values are received from the first sensor that outputs a first electronic signal with a response to ambient temperature, the response having a first time constant, and the second sensor temperature values are received from the second sensor that outputs a second electronic signal with a response to ambient temperature, the response having a second time constant greater than the first time constant.

19. The sensor system of claim 17, wherein the first sensor temperature values are derived from a sequence of electrical resistance values that are output from a first sensor, wherein the first sensor temperature values vary according to the electrical resistance, a thermal coefficient of resistance for the first sensor, and an initial estimate of the electrical resistance at the first time period.

20. The sensor system of claim 19, wherein each first sensor temperature value is equal to a difference of one of the electrical resistance values and the initial estimate, the difference then divided by the thermal coefficient of resistance.

\* \* \* \* \*